United States Patent
Ostdiek et al.

(10) Patent No.: US 12,410,758 B2
(45) Date of Patent: Sep. 9, 2025

(54) THREE-STREAM GAS TURBINE ENGINE CONTROL

(71) Applicant: General Electric Company, Schenectady, NY (US)

(72) Inventors: David Marion Ostdiek, Liberty Township, OH (US); Jeffrey S. Spruill, Hillsboro, OH (US); Stefan Joseph Cafaro, Chapel Hill, NC (US); David Alexander Hiett, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 17/571,642

(22) Filed: Jan. 10, 2022

(65) Prior Publication Data
US 2023/0220815 A1     Jul. 13, 2023

(51) Int. Cl.
*F02C 9/20*     (2006.01)
*F02K 3/02*     (2006.01)
(Continued)

(52) U.S. Cl.
CPC .......... *F02C 9/20* (2013.01); *F02K 3/02* (2013.01); *F02K 3/075* (2013.01); *F02K 3/077* (2013.01); *F05D 2270/303* (2013.01)

(58) Field of Classification Search
CPC . F02K 3/02; F02K 3/075; F02K 3/077; F02C 9/20
See application file for complete search history.

(56) References Cited

U.S. PATENT DOCUMENTS

| | | | |
|---|---|---|---|
| 4,064,692 A | | 12/1977 | Johnson et al. |
| 4,446,696 A | * | 5/1984 | Sargisson ............... F02K 3/077 60/226.3 |

(Continued)

FOREIGN PATENT DOCUMENTS

| | | |
|---|---|---|
| EP | 2971723 A1 | 1/2016 |
| WO | WO2011038216 | 3/2011 |

OTHER PUBLICATIONS

Carney et al., Weight Assessment for Fuselage Shielding on Aircraft With Open-Rotor Engines and Composite Blade Loss, NASA/TM-2013-216582, 2013, 33 Pages.
(Continued)

*Primary Examiner* — Lorne E Meade
(74) *Attorney, Agent, or Firm* — Smith Gambrell & Russell LLP

(57) ABSTRACT

A control system and schemes for controlling a three-stream gas turbine engine are disclosed. In one aspect, a three-stream engine is architecturally arranged so as to define a primary bypass flowpath, a secondary bypass flowpath, and a core flowpath that may each output propulsive thrust. The three-stream engine includes one or more effectors that can be controlled to adjust a thrust contribution provided by the secondary bypass flowpath to the net propulsive thrust as well as a thermal contribution provided by the secondary bypass flowpath to an associated thermal management system. Competing demands, limits, and priorities can be considered in controlling the effector. In some embodiments, a secondary effector can be ganged or controlled in conjunction with the effector to assist with adjustment of the contributions provided by the secondary bypass flowpath.

9 Claims, 17 Drawing Sheets

(51) Int. Cl.
*F02K 3/075* (2006.01)
*F02K 3/077* (2006.01)

(56) References Cited

U.S. PATENT DOCUMENTS

| | | | |
|---|---|---|---|
| 4,534,526 | A | 8/1985 | Metzger et al. |
| 4,917,336 | A | 4/1990 | Jacobs et al. |
| 4,934,825 | A | 6/1990 | Martin |
| 4,976,102 | A | 12/1990 | Taylor |
| 5,148,402 | A | 9/1992 | Magliozzi et al. |
| 5,156,353 | A | 10/1992 | Gliebe et al. |
| 5,190,441 | A | 3/1993 | Murphy et al. |
| 5,197,855 | A | 3/1993 | Magliozzi et al. |
| 5,261,227 | A * | 11/1993 | Giffin, III ............ F01D 17/162 60/226.3 |
| 5,789,678 | A | 8/1998 | Pla |
| 6,341,747 | B1 | 1/2002 | Schmidt et al. |
| 6,735,955 | B2 * | 5/2004 | Mannarino ......... F04D 27/0261 60/794 |
| 7,578,132 | B2 | 8/2009 | Webster |
| 7,762,084 | B2 * | 7/2010 | Martis ................. F01D 17/162 60/785 |
| 8,011,613 | B2 | 9/2011 | Belleville |
| 8,083,482 | B2 | 12/2011 | Serven et al. |
| 8,087,607 | B2 | 1/2012 | Moore et al. |
| 8,186,617 | B2 | 5/2012 | Llamas Sandin |
| 8,196,860 | B2 | 6/2012 | Gall et al. |
| 8,210,798 | B2 | 7/2012 | Stern |
| 8,220,586 | B2 | 7/2012 | Todorovic |
| 8,240,609 | B2 | 8/2012 | Parazzoli et al. |
| 8,350,398 | B2 | 1/2013 | Butt |
| 8,352,099 | B1 * | 1/2013 | Eggold ................. B64C 19/00 701/4 |
| 8,550,397 | B2 | 10/2013 | Verde Preckler et al. |
| 8,690,106 | B1 | 4/2014 | Reissig |
| 8,967,967 | B2 | 3/2015 | Stretton et al. |
| 9,057,329 | B2 | 6/2015 | Weir et al. |
| 9,102,397 | B2 | 8/2015 | Wood |
| 9,527,578 | B2 | 12/2016 | Towkan |
| 9,540,094 | B2 | 1/2017 | Negulescu et al. |
| 9,677,501 | B2 | 6/2017 | Pierluissi et al. |
| 9,725,155 | B2 | 8/2017 | Miller et al. |
| 9,745,051 | B2 | 8/2017 | Tantot et al. |
| 9,758,254 | B2 | 9/2017 | Moore et al. |
| 9,845,768 | B2 | 12/2017 | Pesyna et al. |
| 9,856,745 | B2 | 1/2018 | Ali |
| 9,890,657 | B2 | 2/2018 | Ali |
| 9,920,710 | B2 | 3/2018 | Dawson et al. |
| 10,118,710 | B2 | 11/2018 | Derrez et al. |
| 10,131,441 | B2 | 11/2018 | Edwards et al. |
| 10,190,506 | B2 | 1/2019 | Ruberte Sanchez |
| 10,202,865 | B2 | 2/2019 | Breeze-Stringfellow et al. |
| 10,364,750 | B2 | 7/2019 | Rambo |
| 10,370,086 | B2 | 8/2019 | Vion et al. |
| 10,371,090 | B2 | 8/2019 | Lovett et al. |
| 10,378,452 | B1 | 8/2019 | Barmichev et al. |
| 10,399,664 | B2 | 9/2019 | Bowden et al. |
| 10,400,710 | B2 | 9/2019 | Dawson et al. |
| 10,414,486 | B2 | 9/2019 | Wood et al. |
| 10,414,497 | B2 | 9/2019 | Velez De Mendizabal Alonso et al. |
| 10,669,881 | B2 | 6/2020 | Breeze-Stringfellow et al. |
| 10,787,996 | B2 | 9/2020 | Kupratis et al. |
| 2007/0000232 | A1 | 1/2007 | Powell et al. |
| 2008/0245925 | A1 | 10/2008 | Udall |
| 2011/0115227 | A1 * | 5/2011 | Shafer ................. F02K 3/115 290/52 |
| 2011/0150627 | A1 | 6/2011 | Baughman |
| 2011/0167792 | A1 | 7/2011 | Johnson et al. |
| 2012/0195739 | A1 | 8/2012 | Kingan |
| 2013/0115083 | A1 | 5/2013 | Vuillemin |
| 2014/0248116 | A1 | 9/2014 | Ali |
| 2014/0263737 | A1 | 9/2014 | Pierluissi et al. |
| 2015/0291276 | A1 | 10/2015 | Zatorski et al. |
| 2015/0344127 | A1 | 12/2015 | Wood et al. |
| 2016/0010487 | A1 | 1/2016 | Breeze-Stringfellow et al. |
| 2016/0333729 | A1 | 11/2016 | Miller et al. |
| 2016/0333734 | A1 | 11/2016 | Bowden et al. |
| 2016/0368592 | A1 | 12/2016 | Szymandera |
| 2017/0002688 | A1 | 1/2017 | Beutin et al. |
| 2017/0159571 | A1 | 6/2017 | Sidelkovskiy |
| 2017/0225773 | A1 | 8/2017 | Wood et al. |
| 2018/0065727 | A1 | 3/2018 | Gruber et al. |
| 2018/0079492 | A1 | 3/2018 | Seidel et al. |
| 2018/0127084 | A1 | 5/2018 | Tajan et al. |
| 2018/0354634 | A1 | 12/2018 | Jodet et al. |
| 2019/0128189 | A1 | 5/2019 | Rambo |
| 2020/0088109 | A1 * | 3/2020 | Tang .................... F02C 9/20 |
| 2020/0332726 | A1 | 10/2020 | Kehoe et al. |
| 2021/0139156 | A1 * | 5/2021 | Hamel .................. F02C 9/28 |

OTHER PUBLICATIONS

Gazzaniga et al., Wind Tunnel Performance Results of Swirl Recovery Vanes as Tested with an Advanced High-Speed Propeller, AIAA-92-3770, 28th Joint Propulsion Conference Exhibit, Nashville TN, Jul. 6-8, 1992, 42 Pages.

Open Rotor Engine and Installation, European Aviation Safety Agency, Notice of Proposed Amendment 2015-22, RMT.0384 (MDM.092) Dec. 21, 2015., 96 Pages.

\* cited by examiner

500 ↘

502 — DETERMINING, BY ONE OR MORE PROCESSORS, AN EFFECTOR DEMAND FOR AN EFFECTOR OF THE THREE-STREAM GAS TURBINE ENGINE, THREE-STREAM ENGINE HAVING A PRIMARY FAN AND A MID-FAN AND DEFINING A PRIMARY BYPASS FLOWPATH, A SECONDARY BYPASS FLOWPATH, AND A CORE FLOWPATH, THE EFFECTOR DEMAND BEING DETERMINED BY AN INTERACTION BETWEEN: I) AN EFFECTOR SCHEDULE DETERMINED BASED AT LEAST IN PART ON A THRUST DEMAND, THE THRUST DEMAND BEING ASSOCIATED WITH THRUST TO BE PRODUCED BY THREE-STREAM GAS TURBINE ENGINE, II) A THERMAL DEMAND ASSOCIATED WITH A THERMAL MANAGEMENT SYSTEM COUPLED TO OR INTEGRATED WITH THE THREE-STREAM GAS TURBINE ENGINE, III) AN OPERABILITY DEMAND ASSOCIATED WITH OPERABILITY OF THE THREE-STREAM GAS TURBINE ENGINE; AND IV) A THRUST LIMIT ASSOCIATED WITH CONTROLLABILITY OF THE AIRCRAFT

504 — CAUSING, BY THE ONE OR MORE PROCESSORS, THE EFFECTOR TO ADJUST AN AIRFLOW THROUGH A SECONDARY BYPASS FLOWPATH DEFINED BY THE THREE-STREAM ENGINE BASED AT LEAST IN PART ON THE EFFECTOR DEMAND

FIG. 14

THREE-STREAM GAS TURBINE ENGINE CONTROL

FIELD

The present subject matter relates generally to gas turbine engines, and more particularly to control of gas turbine engines.

BACKGROUND

Some gas turbine engines for aircraft have or are coupled with a thermal management system that manage the engine and/or aircraft heat loads. Such gas turbine engines are also typically responsible for producing the thrust needed to propel the aircraft. Control systems and schemes for controlling a thrust contribution of a gas turbine engine as well as a thermal contribution to its associated thermal management system would be a welcome addition to the art.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 14 provides a flow diagram for a method of operating a three-stream engine according to various embodiments of the present disclosure.

DETAILED DESCRIPTION

Figure 1:
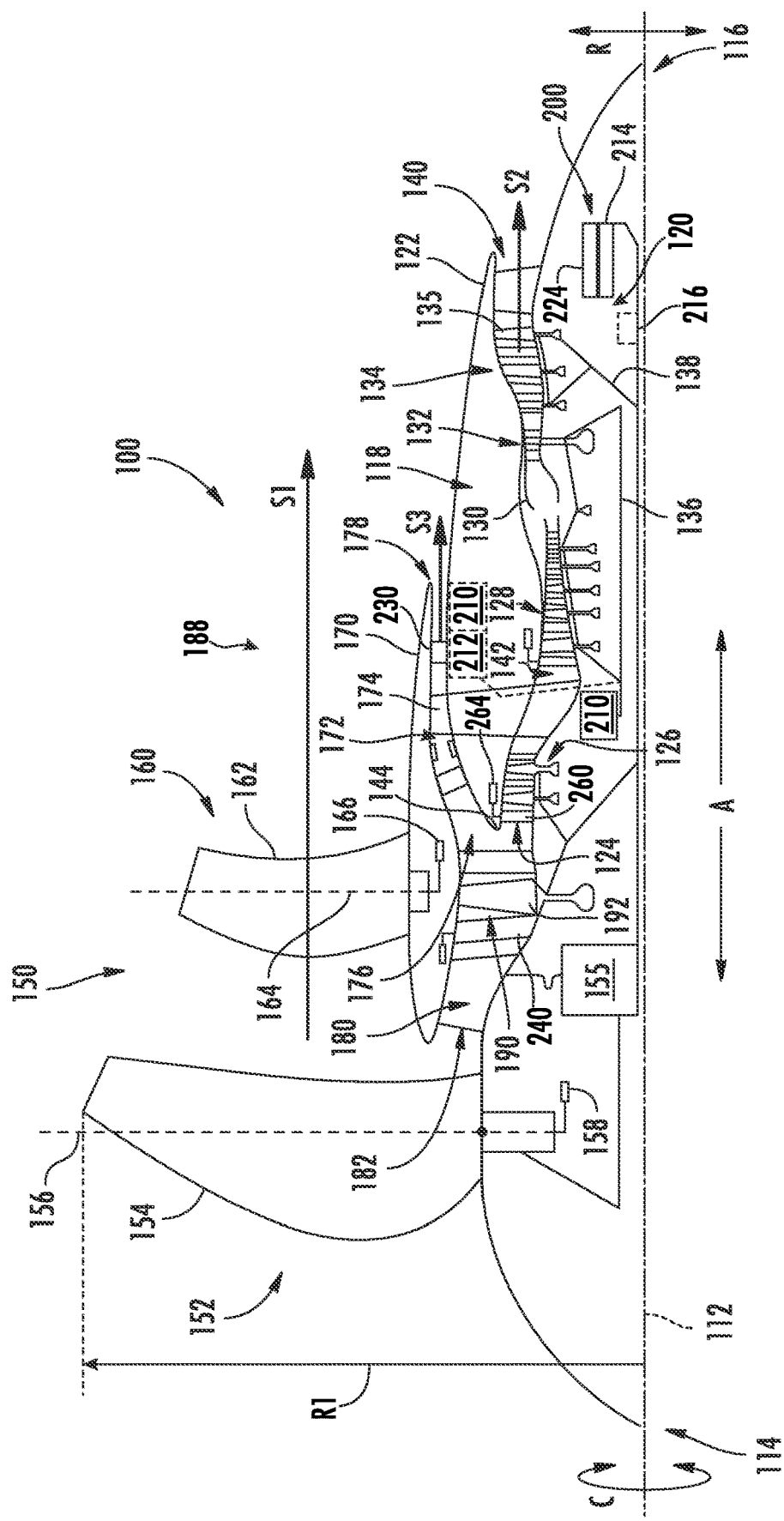
FIG. 1 provides a schematic cross-sectional view of a three-stream gas turbine engine according to various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or relative importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 2, 5, 10, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

Aspects of the present disclosure are directed to control systems and schemes for controlling a three-stream gas turbine engine. In one aspect, a three-stream engine is provided that is architecturally arranged so as to produce three distinct streams of propulsive thrust that collectively provide the net propulsive thrust of the engine. The three-stream gas turbine engine defines a primary bypass flowpath, a secondary bypass flowpath, and a core flowpath that may each output propulsive thrust. The three-stream engine can include one or more effectors that can be controlled to adjust a thrust contribution provided by the secondary bypass flowpath to the net propulsive thrust as well as a thermal contribution provided by the secondary bypass flowpath to an associated thermal management system. Competing demands, limits, and priorities can be considered in controlling the effector. In some embodiments, a secondary effector can be ganged or controlled in conjunction with the effector to assist with adjustment of the contributions provided by the secondary bypass flowpath.

Three-stream engines architecturally arranged and operable to implement one or more of the disclosed control schemes may have certain advantages and benefits. For instance, such control schemes may allow for optimized or otherwise improved performance and constraint handling of three-stream engines. Priority of the thrust capability and/or the cooling capability of such three-stream engines can be adjusted for optimized or otherwise improved performance whilst maintaining operability and safe operation. Specifically, such control schemes may take into consideration compressor operating lines, thermal constraints or demands, fan speed or propeller torque, limits associated with variable geometry components, as well as the controllability of the aircraft or vehicle to which the three-stream engine is mounted. Operable, rapid transient capability may be achieved by such three-stream engines. Other benefits and advantages may be realized as well.

Turning now to the drawings, FIG. 1 provides a schematic cross-sectional view of a gas turbine engine according to one example embodiment of the present disclosure. Particularly, FIG. 1 provides an aviation three-stream gas turbine engine herein referred to as "three-stream engine 100". The three-stream engine 100 of FIG. 1 can be mounted to an aerial vehicle, such as a fixed-wing aircraft, and can produce thrust for propulsion of the aerial vehicle. The three-stream engine 100 is a "three-stream engine" in that its architecture provides three distinct streams of thrust-producing airflow during operation.

For reference, the three-stream engine 100 defines an axial direction A, a radial direction R, and a circumferential direction C. Moreover, the three-stream engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The three-stream engine 100 extends between a forward end 114 and an aft end 116, e.g., along the axial direction A.

The three-stream engine 100 includes a core engine 118 and a fan section 150 positioned upstream thereof. Generally, the core engine 118 includes, in serial flow order, a compressor section, a combustion section, a turbine section, and an exhaust section. Particularly, as shown in FIG. 1, the core engine 118 includes an engine core 120 and a core cowl 122 that annularly surrounds at least a portion of the engine core 120. The engine core 120 and core cowl 122 define an annular core inlet 124. The core cowl 122 further encloses and supports a booster or low pressure compressor 126 for pressurizing the air that enters the core engine 118 through the core inlet 124. A high pressure, multi-stage, axial-flow compressor 128 receives pressurized air from the LP compressor 126 and further increases the pressure of the air. The pressurized air stream flows downstream to a combustor 130 where fuel is injected into the pressurized air stream and ignited to raise the temperature and energy level of the pressurized air.

The high energy combustion products flow from the combustor 130 downstream to a high pressure turbine 132. The HP turbine 132 drives the HP compressor 128 through a first shaft or high pressure shaft 136. In this regard, the HP turbine 132 is drivingly coupled with the HP compressor 128. The high energy combustion products then flow to a low pressure turbine 134. The LP turbine 134 drives the LP compressor 126, components of the fan section 150, and optionally, an electric machine 200 through a second shaft or low pressure shaft 138. In this regard, the LP turbine 134 is drivingly coupled with the LP compressor 126, components of the fan section 150, and the electric machine 200. The LP shaft 138 is coaxial with the HP shaft 136 in this example embodiment. After driving each of the turbines 132, 134, the combustion products exit the core engine 118 through a core exhaust nozzle 140 to produce propulsive thrust. Accordingly, the core engine 118 defines a core flowpath 142 that extends between the core inlet 124 and the core exhaust nozzle 140. The core flowpath 142 is an annular flowpath positioned generally inward of the core cowl 122 along the radial direction R.

The fan section 150 includes a primary fan 152. For the depicted embodiment of FIG. 1, the primary fan 152 is an open rotor or unducted primary fan. However, in other embodiments, the primary fan 152 may be a ducted fan. For instance, in FIG. 3A, the primary fan 152 is shown ducted by a fan casing 157 or nacelle circumferentially surrounding the primary fan 152. Returning to FIG. 1, the primary fan 152 includes an array of fan blades 154 (only one shown in FIG. 1). The fan blades 154 are rotatable, e.g., about the longitudinal axis 112. As noted above, the primary fan 152 is drivingly coupled with the LP turbine 134 via the LP shaft 138. In some embodiments, the primary fan 152 can be directly coupled with the LP shaft 138, e.g., in a direct-drive configuration. In other embodiments, as shown in FIG. 1, the primary fan 152 can be mechanically coupled with the LP shaft 138 via a speed reduction gearbox 155, e.g., in an indirect-drive or geared-drive configuration.

Moreover, the fan blades 154 can be arranged in equal spacing around the longitudinal axis 112. Each blade 154 has a root and a tip and a span defined therebetween. Each blade 154 defines a central blade axis 156. For this embodiment, each blade 154 of the primary fan 152 is rotatable about their respective central blade axes 156, e.g., in unison with one another. One or more actuators 158 can be controlled to pitch the fan blades 154 about their respective central blade axes 156. As will be explained further herein, the fan blades 154 can be pitched or rotated about their respective central blade axes 156 to effect or control the airflow through the secondary bypass flowpath 172. In this way, the fan blades 154 can be modulated to optimize or otherwise improve the thrust contribution of the secondary bypass flowpath 172 or to optimize or otherwise improve the thermal management contribution provided by the secondary bypass flowpath 172, or stated another way, its interaction with a thermal management system.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or may be shrouded, e.g., by an annular shroud spaced outward from the tips of the fan guide vanes 162 along the radial direction R. Each fan guide vane 162 defines a central blade axis 164. For this embodiment, each fan guide vane 162 of the fan guide vane array 160 is rotatable about their respective central blades axes 164, e.g., in unison with one another. One or more actuators 166 can be controlled to pitch the fan guide vane 162 about their respective central blades axes 164. However, in other embodiments, each fan guide vane 162 may be fixed or unable to be pitched. The fan guide vanes 162 are mounted to an outer cowl 170.

The outer cowl 170 annularly encases at least a portion of the core cowl 122 and is generally positioned outward of the core cowl 122 along the radial direction R. Particularly, a downstream section of the outer cowl 170 extends over a forward portion of the core cowl 122 to define a secondary bypass flowpath 172. Incoming air may enter through the secondary bypass flowpath 172 through a secondary bypass inlet 176 and may exit through a secondary bypass outlet 178 to produce propulsive thrust. The secondary bypass flowpath 172 is an annular flowpath generally defined outward of the core flowpath 142 along the radial direction R. The outer cowl 170 and the core cowl 122 are connected together and supported by a plurality of substantially radially-extending, circumferentially-spaced struts 174 (only one shown in FIG. 1). The struts 174 may each be aerodynamically contoured to direct air flowing thereby. Other struts in addition to struts 174 may be used to connect and support the outer cowl 170 and/or core cowl 122.

Figure 2:
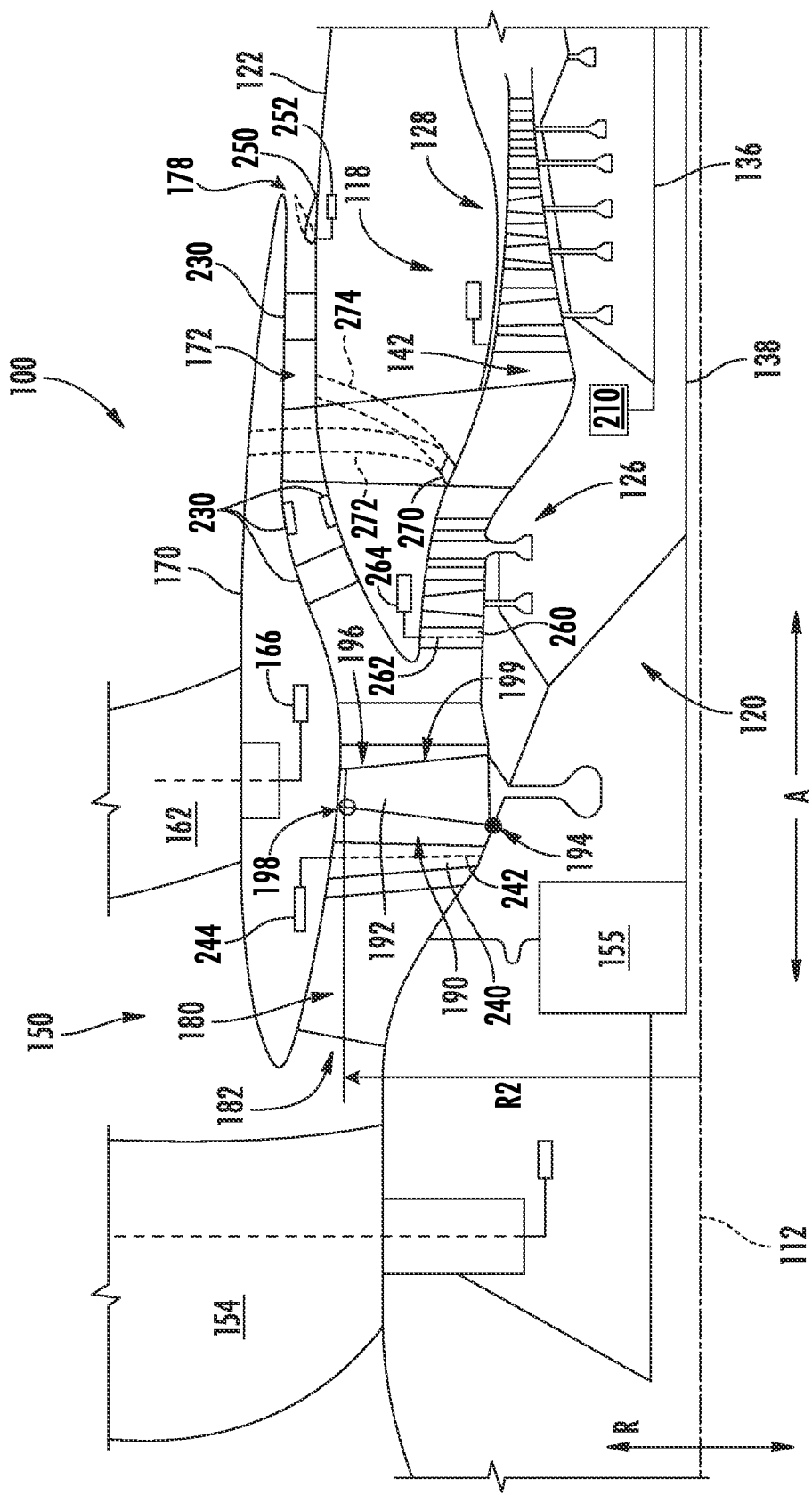
FIG. 2 provides a close-up, schematic cross-sectional view of a forward portion of the three-stream engine of FIG. 1.

Referring now to FIGS. 1 and 2, FIG. 2 provides a close-up, schematic cross-sectional view of a forward portion of the three-stream engine 100. As depicted, one or more heat exchangers 230 can be incorporated into or within the secondary bypass flowpath 172. The one or more heat exchangers 230 may be configured to remove or accept heat from various fluids used in engine operation (such as an air-cooled oil cooler (ACOC), cooled cooling air (CCA), etc.). The heat exchangers 230 may take advantage of the integration into the secondary bypass flowpath 172 with reduced performance penalties (such as fuel efficiency and thrust) compared with traditional engine architectures due to not impacting the primary source of thrust which is, in this case, the unducted fan stream labeled as S1 in FIG. 1. The heat exchangers 230 may cool fluids such as gearbox oil, engine sump oil, thermal transport fluids, such as supercritical fluids or commercially available single-phase or two-phase fluids (supercritical CO2, EGV, Syltherm 800, liquid metals, etc.), engine bleed air, etc. The heat exchangers 230 may also be made up of different segments or passages that cool different working fluids, such as an ACOC paired with a fuel cooler. One or more of the heat exchangers 230 can have an associated temperature sensor operable to sense the temperature at the heat exchanger 230. Various third stream effectors can be controlled based on such temperature readings.

The heat exchangers 230 may be incorporated into a thermal management system that provides for thermal transport via a heat exchange fluid flowing through a network or thermal bus to remove heat from a source and transport it to a heat exchanger, such as one or more of heat exchangers 230. One such system is described in commonly-assigned, issued U.S. Pat. No. 10,260,419, which is incorporated herein by reference.

The three-stream engine 100 also defines an inlet flowpath 180. The inlet flowpath 180 extends between an engine inlet 182 and the core inlet 124/secondary bypass inlet 176. The engine inlet 182 is defined generally at the forward end of the outer cowl 170 and is positioned between the primary fan 152 and the array of fan guide vanes 160 along the axial direction A. The inlet flowpath 180 is an annular flowpath that is defined inward of the outer cowl 170 along the radial direction R. Air flowing downstream along the inlet flowpath 180 is split, not necessarily evenly, into the core flowpath 142 and the secondary bypass flowpath 172 by a nose of a splitter 144 of the core cowl 122. The inlet flowpath 180 is wider than the core flowpath 142 along the radial direction R. The inlet flowpath 180 is also wider than the secondary bypass flowpath 172 along the radial direction R.

As depicted, the fan section 150 also includes a mid-fan 190. The mid-fan 190 includes an array of mid-fan blades 192 (only one shown in FIG. 1). The mid-fan blades 192 are rotatable, e.g., about the longitudinal axis 112. The mid-fan 190 is drivingly coupled with the LP turbine 134 via the LP shaft 138. The mid-fan blades 192 can be arranged in equal circumferential spacing around the longitudinal axis 112. As shown in FIG. 2, each mid-fan blade 192 has a root 194 and a tip 196 and a span defined therebetween. Moreover, each mid-fan blade 192 has a leading edge 198 and a trailing edge 199. The mid-fan blades 192 are annularly surrounded or ducted by the outer cowl 170. In this regard, the mid-fan 190 is positioned inward of the outer cowl 170 along the radial direction R. Moreover, for this example embodiment, the mid-fan 190 is positioned within the inlet flowpath 180 upstream of both the core flowpath 142 and the secondary bypass flowpath 172.

Air flowing through the inlet flowpath 180 flows across the mid-fan blades 192 and is accelerated downstream thereof, particularly at the tips 196 of the mid-fan blades 192. At least a portion of the air accelerated by the mid-fan blades 192 flows into the secondary bypass flowpath 172 and is ultimately exhausted through the secondary bypass outlet 178 to produce propulsive thrust. Also, at least a portion of the air accelerated by the mid-fan blades 192 flows into the core flowpath 142 and is ultimately exhausted through the core exhaust nozzle 140 to produce propulsive thrust. Generally, the mid-fan 190 is a compression device positioned downstream of the engine inlet 182. The mid-fan 190 is operable to accelerate air into the secondary bypass flowpath 172 or secondary bypass passage.

As further shown in FIGS. 1 and 2, an array of variable inlet guide vanes 240 is positioned upstream of the mid-fan 190. Particularly, the variable inlet guide vanes 240 are positioned immediately upstream of the mid-fan 190 and downstream of the engine inlet 182. Moreover, the variable inlet guide vanes 240 can be arranged in equal spacing around the longitudinal axis 112. Each variable inlet guide vane 240 defines a central vane axis 242. For this embodiment, the variable inlet guide vanes 240 are rotatable about their respective central vane axes 242, e.g., in unison with one another. One or more actuators 244 can be controlled to pitch the variable inlet guide vanes 240 about their respective central vane axes 242. As will be explained further herein, the variable inlet guide vanes 240 can be pitched or rotated about their respective central vane axes 242 to effect or control the airflow through the secondary bypass flowpath 172. In this way, the variable inlet guide vanes 240 can be modulated to optimize or otherwise improve the thrust contribution of the secondary bypass flowpath 172 or to optimize or otherwise improve the thermal management contribution provided by the secondary bypass flowpath 172, or rather, interaction between the secondary bypass flowpath 172 and a thermal management system.

In some embodiments, optionally, the three-stream engine 100 can include a variable nozzle 250 (see FIG. 2) incorporated into or positioned along the secondary bypass flowpath 172. For this embodiment, the variable nozzle 250 is positioned at or immediately upstream of the secondary bypass outlet 178. The variable nozzle 250 can be a slidable, moveable, and/or translatable plug. For instance, the variable nozzle 250 can be moved between a first or open position and a second or closed position. In FIG. 2, the variable nozzle 250 is shown in the open position via solid lines and in the closed position via the phantom lines. In some embodiments, the variable nozzle 250 can be moved to a position between the open and closed positions, i.e., to an intermediate position. The variable nozzle 250 can be moved by an actuator 252 to vary the exit area through the secondary bypass outlet 178. The variable nozzle 250 can be an annular, symmetrical device that can be controlled to regulate the airflow through the secondary bypass flowpath 172. Other suitable nozzle designs may be employed as well, including those incorporating thrust reversing functionality. As will be explained further herein, the variable nozzle 250 can be moved to effect or control the airflow through the secondary bypass flowpath 172. In this way, the variable nozzle 250 can be modulated to optimize or otherwise improve the thrust contribution of the secondary bypass flowpath 172 or to optimize or otherwise improve the thermal management contribution provided by the secondary bypass flowpath 172, or stated differently, its interaction with a thermal management system.

The three-stream engine 100 can include other variable geometries as well. For instance, the booster or LP compressor 126 can include one or more stages of compressors rotor blades and compressor stator vanes, wherein at least one stage of compressor stator vanes are variable stator vanes. For instance, as shown in FIGS. 1 and 2, the LP compressor 126 includes at least one stage of compressor stator vanes, which are booster inlet guide vanes 260 in this example. The booster inlet guide vanes 260 are positioned downstream of the mid-fan 190 and are positioned within the core flowpath 142. The booster inlet guide vanes 260 can be arranged in equal spacing around the longitudinal axis 112. Each booster inlet guide vane 260 defines a central vane axis 262. For this embodiment, each booster inlet guide vane 260 is rotatable about their respective central vane axes 262, e.g., in unison with one another. One or more actuators 264 can be controlled to pitch the booster inlet guide vanes 260 about their respective central vane axes 262. As will be explained further herein, the booster inlet guide vanes 260 can be pitched or rotated about their respective central vane axes 262 to assist with controlling one or more properties of the airflow through the secondary bypass flowpath 172.

In addition, as shown in FIG. 2, the three-stream engine 100 can include a variable bleed valve 270 positioned downstream of the LP compressor 126 and upstream of the HP compressor 128. By modulating the variable bleed valve 270, air may be bled from the core flowpath 142. Air can be bled from the core flowpath 142 so that debris can be extracted or expelled from the core flowpath 142, and to change the operating line of the compressor systems relative to their respective stall lines, among other reasons. The three-stream engine 100 defines at least one of an offboard bleed duct 272 and a secondary bleed duct 274. The offboard bleed duct 272 provides fluid communication between the core flowpath 142 and offboard the three-stream engine 100. In this regard, air bled from the core flowpath 142 via the offboard bleed duct 272 is expelled offboard the three-stream engine 100, e.g., into a primary propulsion stream or first thrust stream S1 (FIG. 1). The secondary bleed duct 274 provides fluid communication between the core flowpath 142 and the secondary bypass flowpath 172. In this way, air bled from the core flowpath 142 via the secondary bleed duct 274 is expelled into the secondary bypass flowpath 172. As will be explained further herein, the variable bleed valve 270 can be modulated to assist with controlling one or more properties of the airflow through the secondary bypass flowpath 172.

Embodiments of the three-stream engine 100 provided herein generate an increased unducted rotor efficiency at and above a threshold power loading (i.e., power/area of rotor airfoil). In certain embodiments, the threshold power loading is 25 horsepower per $ft^2$ or greater at cruise altitude. In particular embodiments of the engine, structures and methods provided herein generate power loading between 25 horsepower/$ft^2$ and 100 horsepower/$ft^2$ at cruise altitude. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degree Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

As such, it will be appreciated that an engine of such a configuration is configured to generate between about 25,000 and 35,000 pounds of thrust during operation at a rated speed. It will be appreciated, however, that the inventive aspects of the present disclosure are applicable to engines operable to produce between about 2,000 and 130,000 pounds of thrust during operation at a rated speed. Moreover, the inventive aspects of the present disclosure are applicable to engines operable to produce between about 1,000 and 130,000 pounds of thrust during operation.

For the exemplary embodiment of FIG. 1, the primary fan 152 includes twelve (12) fan blades 154. From a loading standpoint, such a blade count may allow a span of each blade 154 to be reduced such that the overall diameter of the primary fan 152 may also be reduced (e.g., to about twelve feet in the exemplary embodiment). That said, in other embodiments, the primary fan 152 may have any suitable blade count and any suitable diameter. In certain suitable embodiments, the primary fan 152 includes at least eight (8) blades 154. In another suitable embodiment, the primary fan 152 may have at least twelve (12) blades 154. In yet another suitable embodiment, the primary fan 152 may have at least fifteen (15) blades 154. In yet another suitable embodiment, the primary fan 152 may have at least eighteen (18) blades 154. In one or more of these embodiments, the primary fan 152 includes twenty-six (26) or fewer blades 154, such as twenty (20) or fewer blades 154. Further, in certain exemplary embodiments, the primary fan 152 may define a diameter of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 16 feet.

In various embodiments, it will be appreciated that the three-stream engine 100 includes a ratio of a quantity of vanes 162 to a quantity of blades 154 that could be less than, equal to, or greater than 1:1. For example, in certain embodiments, the three-stream engine 100 may include a ratio of a quantity of vanes 162 to a quantity of blades 154 between 1:2 and 5:2. The ratio may be tuned based on a variety of factors including a size of the vanes 162 to ensure a desired amount of swirl is removed for an airflow from the primary fan 152.

It should be appreciated that various embodiments of the single unducted rotor engine depicted and described herein may allow for normal subsonic aircraft cruise altitude operation at or above Mach 0.5. In certain embodiments, the engine 100 allows for normal aircraft operation between Mach 0.55 and Mach 0.85 at cruise altitude. In certain embodiments, the engine 100 allows for fan tip speeds (i.e., the tip speeds of the fan blades 154) at or less than 750 feet per second (fps). As will further be appreciated from the description herein, a loading of the fan blades 154 of the primary fan 152 or rotor assembly may facilitate such flight speeds.

In addition, the three-stream engine 100 can be arranged to define a primary fan radius to mid-fan radius ratio. The primary fan radius to mid-fan radius ratio is defined as: Primary Fan Radius/Mid-Fan Radius. The Primary Fan Radius is measured as a radial length or radius spanning along the radial direction R between the longitudinal axis 112 and a leading edge tip of one of the fan blades 154 of the primary fan 152. Particularly, as shown best in FIG. 1, the Primary Fan Radius is measured as Radius R1, which spans along the radial direction R between the longitudinal axis 112 and a leading edge tip of one of the primary fan blades 154. The Mid-Fan Radius is measured as a radial length or radius spanning along the radial direction R between the longitudinal axis 112 and a leading edge tip of one of the mid-fan blades 192 of the mid-fan 190. Particularly, as shown in FIG. 2, the Mid-Fan Radius is measured as Radius R2, which spans along the radial direction R between the longitudinal axis 112 and a leading edge tip of one of the mid-fan blades 192.

In some embodiments, the three-stream engine 100 defines the primary fan radius to mid-fan radius ratio as being equal to or greater than 2.0 and less than or equal to 6.5. Particularly, in some embodiments, the three-stream engine 100 defines the primary fan radius to mid-fan radius ratio as being at least about 2.0. In other embodiments, the three-stream engine 100 defines the primary fan radius to mid-fan radius ratio as being at least about 2.5. In yet other embodiments, the three-stream engine 100 defines the primary fan radius to mid-fan radius ratio as being at least about 3.0. For instance, in FIG. 1, the primary fan radius to mid-fan radius ratio is slightly greater than 3.0. In some further embodiments, the three-stream engine 100 defines the primary fan radius to mid-fan radius ratio as being at least about 4.0. In yet other embodiments, the three-stream engine 100 defines the primary fan radius to mid-fan radius ratio as being at least about 6.0. In some other embodiments, the three-stream engine 100 defines the primary fan radius to mid-fan radius ratio as being about 6.5. For the embodiments having the stated lower bounds of the primary fan radius to mid-fan radius ratio mentioned in this paragraph, unless stated otherwise, the upper bound of these noted ratios may be up to 6.5. The inventors of the present disclosure have recognized that three-stream engines having a primary fan and mid-fan arranged according to the noted ranges/ratios advantageously balance aerodynamic performance and engine efficiency with mechanical constraints of the primary fan 152 and mid-fan 190.

With reference to FIG. 1, operation of the three-stream engine 100 may be summarized in the following exemplary manner. During operation, an initial or incoming airflow passes through the fan blades 154 of the primary fan 152 and splits into a first airflow and a second airflow. The first airflow bypasses the engine inlet 182 and flows generally along the axial direction A outward of the outer cowl 170 along the radial direction R. The first airflow accelerated by the primary fan blades 154 passes through the fan guide vanes 162 and continues along a primary bypass flowpath 188 defined by the three-stream engine downstream to produce a primary propulsion stream or first thrust stream S1. The vast majority of the net thrust produced by the three-stream engine 100 is produced by the first thrust stream S1. The second airflow enters the inlet flowpath 180 through annular engine inlet 182.

The second airflow flowing downstream through the inlet flowpath 180 flows through the mid-fan blades 192 of the mid-fan 190 and is consequently compressed. The second airflow flowing downstream of the mid-fan 190 is split by the splitter 144 located at the forward end of the core cowl 122. Particularly, a portion of the second airflow flowing downstream of the mid-fan 190 flows into the core flowpath 142 through the core inlet 124. The portion of the second airflow that flows into the core flowpath 142 is progressively compressed by the LP compressor 126 and HP compressor 128 and is ultimately discharged into the combustion section. The discharged pressurized air stream flows downstream to the combustor 130 where fuel is introduced to generate combustion gases or products.

More particularly, the combustor 130 defines an annular combustion chamber that is generally coaxial with the longitudinal centerline axis 112. The combustor 130 receives an annular stream of pressurized air from the HP compressor 128 via a pressure compressor discharge outlet. A portion of this compressor discharge air flows into a mixer (not shown). Fuel is injected by a fuel nozzle to mix with the air thereby forming a fuel-air mixture that is provided to the combustion chamber for combustion. Ignition of the fuel-air mixture is accomplished by one or more suitable igniters, and the resulting combustion gases flow along the axial direction A toward and into an annular, first stage turbine nozzle of the HP turbine 132. The first stage nozzle is defined by an annular flow channel that includes a plurality of radially-extending, circumferentially-spaced nozzle vanes that turn the gases so that they flow angularly and impinge upon the first stage turbine blades of the HP turbine 132. The combustion products exit the HP turbine 132 and flow through the LP turbine 134 and exit the core flowpath 142 through the core exhaust nozzle 140 to produce a core air stream or second thrust stream S2. For this embodiment, as noted above, the HP turbine 132 drives the HP compressor 128 via the HP shaft 136 and the LP turbine 134 drives the LP compressor 126, the primary fan 152, the mid-fan 190, and the electric machine 200 via the LP shaft 138.

The other portion of the second airflow flowing downstream of the mid-fan 190 is split by the splitter 144 into the secondary bypass flowpath 172. The air enters the secondary bypass flowpath 172 through the secondary bypass inlet 176. The air flows generally along the axial direction A through the secondary bypass flowpath 172 and is ultimately exhausted from the secondary bypass flowpath 172 through the secondary bypass outlet 178 to produce a third thrust stream S3.

A "third stream" or third thrust stream S3 as used herein means a secondary air stream capable of increasing fluid energy to produce a minority of total propulsion system thrust. In some embodiments, a pressure ratio of the third stream is higher than that of the primary propulsion stream (e.g., a bypass or propeller driven propulsion stream). The thrust may be produced through a dedicated nozzle or through mixing of the secondary air stream with the primary propulsion stream or a core air stream, e.g., into a common nozzle. In certain exemplary embodiments, an operating temperature of the secondary air stream is less than a maximum compressor discharge temperature for the engine. The operating temperature of the third stream may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments, these operating temperatures may facilitate heat transfer to or from the third stream and a separate fluid stream. Further, in certain exemplary embodiments, the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions. Furthermore in certain exemplary embodiments, aspects of the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize or otherwise improve overall system performance across a broad range of potential operating conditions.

Figure 3A:
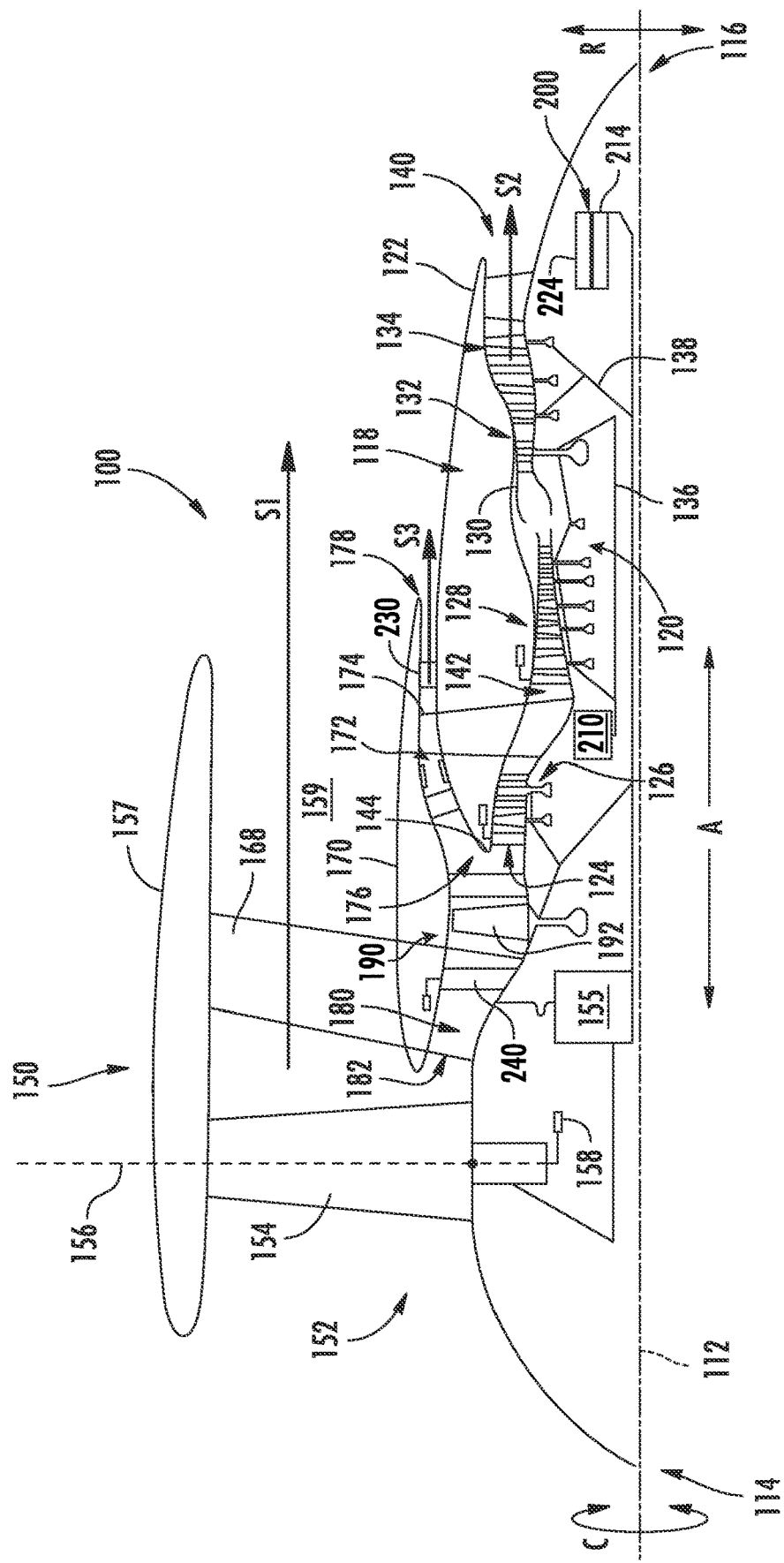
FIGS. 3A, 3B, and 3C provide schematic cross-sectional views of various alternative embodiments of three-stream gas turbine engines according to yet other various embodiments of the present disclosure.

Although three-stream engine 100 has been described and illustrated in FIG. 1 as representing an example three-stream gas turbine engine operable to produce first thrust stream S1, second thrust stream S2, and third thrust stream S3, it will be appreciated that the inventive aspects of the present disclosure may apply to three-stream gas turbine engines having other configurations. For instance, in some embodiments, the three-stream engine 100 may have a centrifugal HP compressor, may not include a booster, may include an electrically-driven booster or LP compressor, etc. Further, in other example embodiments, the primary fan 152 can be ducted by fan casing 157 or outer nacelle, e.g., as shown in FIG. 3A. As shown in FIG. 3A, a bypass passage 159 may be defined between the fan casing 157 and the outer cowl 170. The first thrust stream S1 may flow through the bypass passage 159. One or more circumferentially-spaced outlet guide vanes 168 (only one shown in FIG. 3A) can extend between and connect the fan casing 157, the outer cowl 170, and the engine core 120 to provide structural support for these components. In such embodiments, the speed reduction gearbox 155 and/or the one or more actuators 158 can be optional. In this regard, the primary fan 152 can be directly coupled with the LP shaft 138, e.g., in a direct-drive configuration, and/or the primary fan 152 can be a fixed-pitch fan.

Figure 3B:
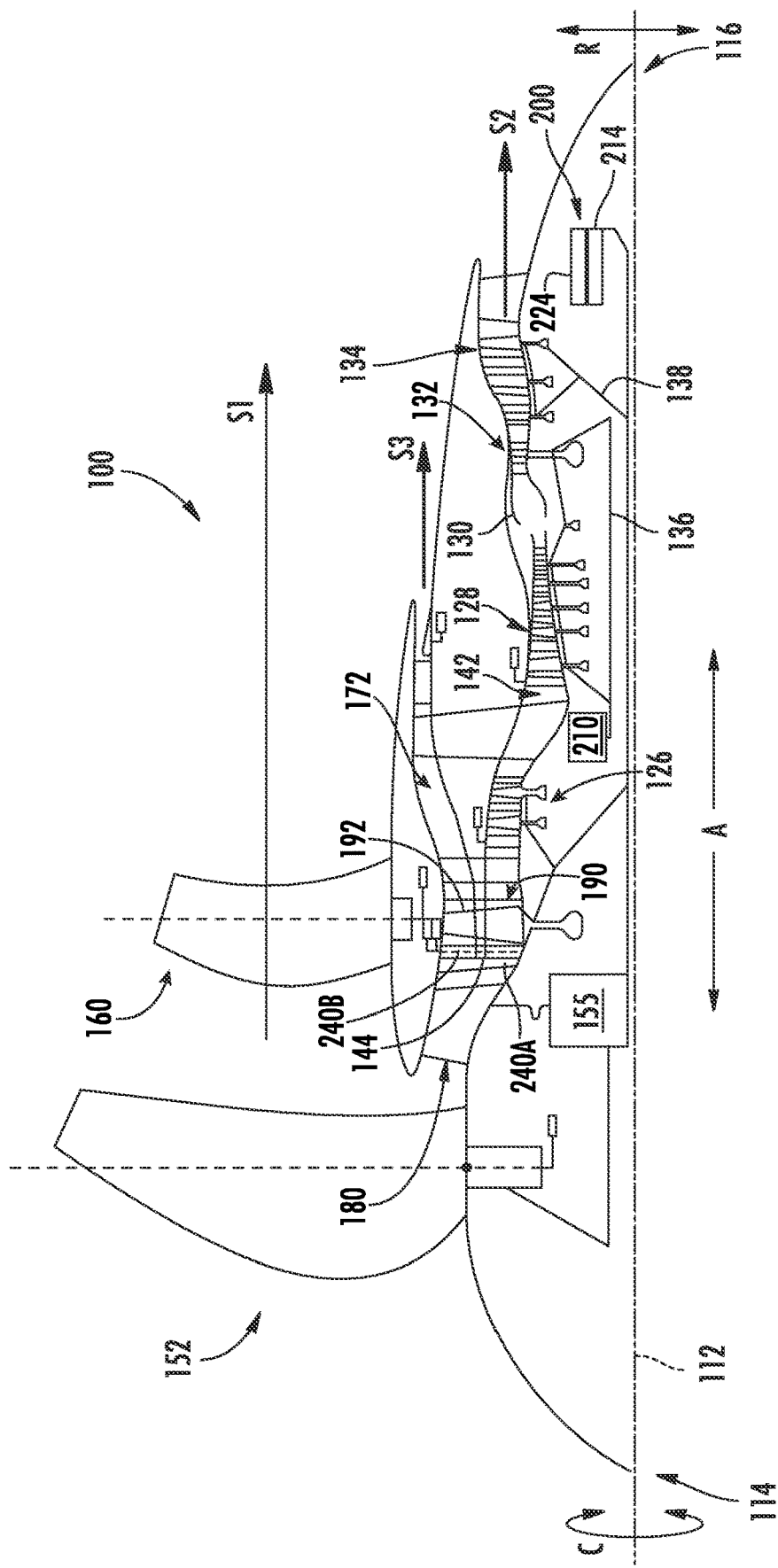
Figure 3C:
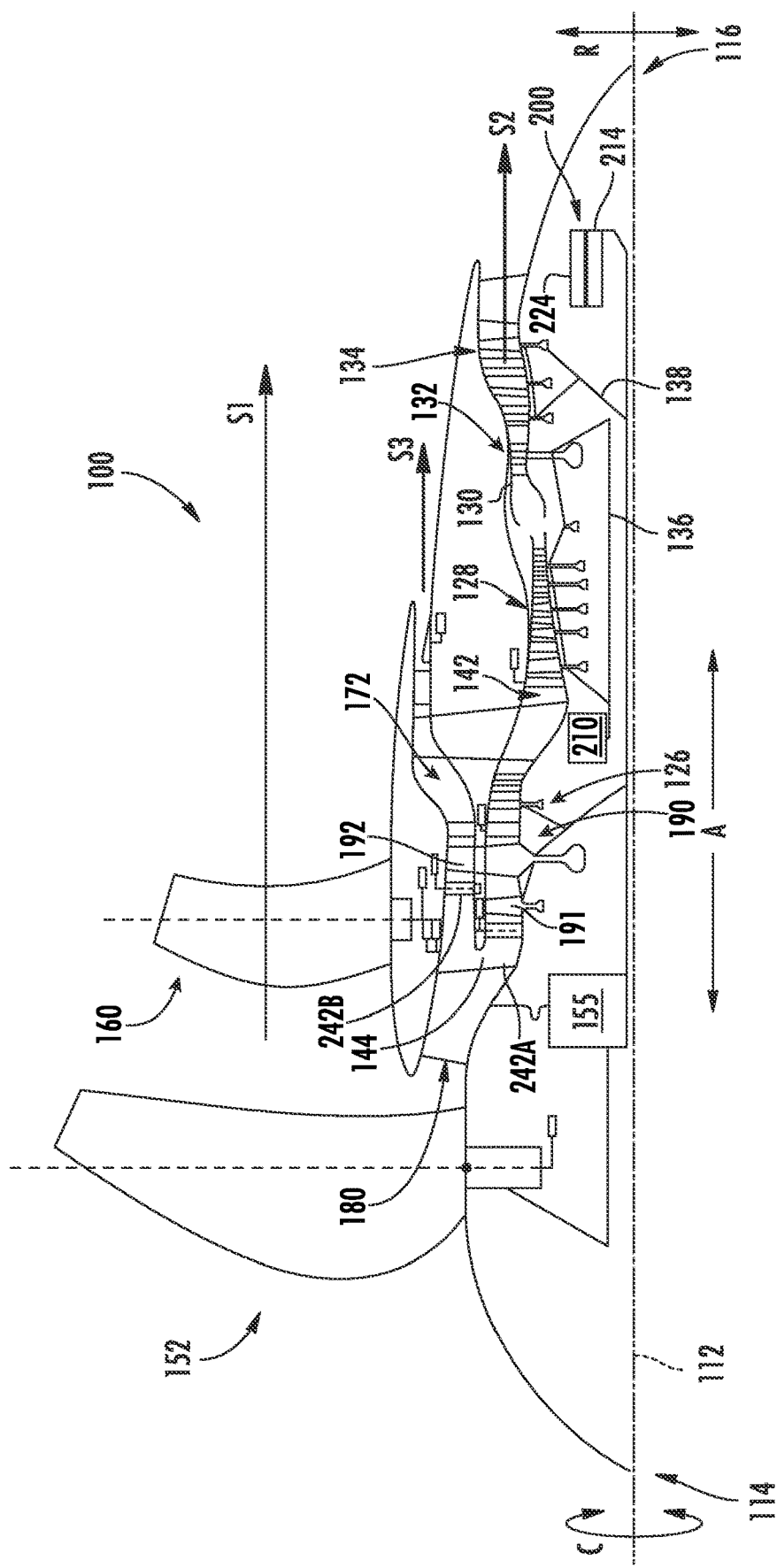

In yet other embodiments, the three-stream engine 100 can have other mid-fan and/or splitter configurations. For instance, as shown in FIGS. 3B and 3C, the nose of the splitter 144 is positioned upstream of the mid-fan 190. In such embodiments, the mid-fan blades 192 may include an integral splitter which effectively divides the air stream into radially inner and radially outer streams (or second and third streams S2, S3) in proximity to the mid-fan 190 itself. Such a configuration may be termed a blade-on-blade configuration where radially inner and radially outer blades are effectively superimposed upon one another and may be unitarily formed or otherwise fabricated to achieve the split between streams. FIGS. 3B and 3C illustrate embodiments with such a blade-on-blade configuration. Such configurations are described in greater detail in commonly-assigned, issued U.S. Pat. No. 4,043,121, which is incorporated herein by reference.

Further, as shown in FIGS. 3B and 3C, the three-stream engine 100 includes a core array of inlet guide vanes 240A having a plurality of inlet guide canes rotatable about their respective central vane axes. The core array of inlet guide vanes 240A are positioned within the core flowpath 142 upstream of the mid-fan 190. The pitch of the inlet guide vanes of the core array of inlet guide vanes 240A can be moved by one or more actuators. Moreover, the three-stream engine 100 also includes a secondary array of inlet guide vanes 240B having a plurality of inlet guide canes rotatable about their respective central vane axes. The secondary array of inlet guide vanes 240B are positioned within the secondary bypass flowpath 172 upstream of the mid-fan 190. The pitch of the inlet guide vanes of the secondary array of inlet guide vanes 240B can be moved by one or more actuators. The pitch of the inlet guide vanes of the core array of inlet guide vanes 240A and the pitch of the inlet guide vanes of the secondary array of inlet guide vanes 240B can be controlled independently by their respective actuators, e.g., to the same or different pitch angles, or in alternative embodiments, they can be controlled to be pitched in unison.

The core array of inlet guide vanes 240A can be stacked (i.e., aligned axially) with the secondary array of inlet guide vanes 240B as shown in FIG. 3B or can be offset from one another along the axial direction A as shown in FIG. 3C.

Moreover, in some embodiments as depicted in FIG. 3C, the three-stream engine 100 can include a mid-fan booster 191 that includes a plurality of circumferentially-spaced mid-fan booster blades mechanically coupled with the LP shaft 138. The mid-fan booster 191 is positioned within the core flowpath 142 upstream of the mid-fan 190 and downstream of the core inlet guide vanes 242A. The mid-fan booster 191 boosts the core airflow before reaching the mid-fan 190.

As further shown in FIG. 1 (as well as the embodiments of FIGS. 3A, 3B, 3C), the three-stream engine 100 includes the electric machine 200 mechanically coupled with a rotating component thereof. In this regard, the three-stream engine 100 is an aeronautical hybrid-electric propulsion machine. Particularly, as shown in FIG. 1, the three-stream engine 100 includes the electric machine 200 mechanically coupled with the LP shaft 138. The electric machine 200 can be directly mechanically connected to the LP shaft 138, or alternatively, the electric machine 200 can be mechanically coupled with the LP shaft 138 indirectly, e.g., by way of a gearbox 216. As shown, the electric machine 200 is embedded within the three-stream engine 100 proximate its aft end 116. Particularly, the electric machine 200 is positioned aft of the mid-fan 190 and at least partially overlapping with or aft of the LP turbine 134 along the axial direction A. Moreover, for this embodiment, the electric machine 200 is positioned inward of the core flowpath 142 along the radial direction R. Although the electric machine 200 is operatively coupled with the LP shaft 138 at an aft end of the LP shaft 138, the electric machine 200 can be coupled with the LP shaft 138 at any suitable location or can be coupled to other rotating components of the three-stream engine 100, such as the HP shaft 136. For instance, in some embodiments, the electric machine 200 can be coupled with the LP shaft 138 and positioned forward of the mid-fan 190 along the axial direction A.

In some embodiments, the electric machine 200 can be an electric motor operable to drive or motor the LP shaft 138, e.g., when additional thrust is needed. In other embodiments, the electric machine 200 can be an electric generator operable to convert mechanical energy into electrical energy. In this way, electrical power generated by the electric machine 200 can be directed to various engine and/or aircraft systems. In some embodiments, the electric machine 200 can be a motor/generator with dual functionality.

The electric machine 200 includes a rotor 214 and a stator 224. The rotor 214 is mechanically coupled with the LP shaft 138 and is rotatable with the LP shaft 138. The stator 224 can be fixed to a structural support member, such as an aft frame member. The electric machine 200 defines a centerline, which is aligned with or coaxial with the longitudinal axis 112 of the three-stream engine 100 in this example embodiment. The rotor 214 and the stator 224 together define an air gap therebetween. Moreover, the rotor 214 can include a plurality of magnets, such as a plurality of permanent magnets, and the stator 224 can include a plurality of windings or coils. As such, the electric machine 200 may be referred to as a permanent magnet electric machine. However, in other exemplary embodiments, the electric machine 200 may be configured in any suitable manner. For example, the electric machine 200 may be configured as an electro-magnetic electric machine, including a plurality of electromagnets and active circuitry, as an induction type electric machine, a switched reluctance type electric machine, a synchronous AC electric machine, an asynchronous electric machine, or as any other suitable electric generator/motor.

The electric machine 200 can be electrically connected to an electric power bus. The electric power bus can be electrically connected to the electric machine 200 at a location inward of the core flowpath 142 along the radial direction R. The electric power bus may extend through the core flowpath 142 (e.g., through an aft frame strut) and electrically connect the electric machine 200 to one or more electrical loads (accessory systems, electric/hybrid-electric propulsion devices, etc.), electrical sources (other electric machines, electric energy storage units, etc.), or both. Electrical power can be provided to the electric machine 200 via the electric power bus, e.g., when the electric machine 200 is operating in a drive mode, and electrical power generated by the electric machine 200 can be carried or transmitted to electrical systems via the electric power bus, e.g., when the electric machine 200 is operating in a generator mode.

Although the electric machine 200 has been described and illustrated in FIG. 1 as having a particular configuration, it will be appreciated that the inventive aspects of the present disclosure may apply to electric machines having alternative configurations. For instance, the stator 224 and/or rotor 214 may have different configurations or may be arranged in a different manner than illustrated in FIG. 1. As one example, in some embodiments, the electric machine 200 may have a tapered configuration in which the rotor 214 and the stator 224 may extend lengthwise along the axial direction A at an angle with respect to the longitudinal axis 112, e.g., so that they are not oriented parallel with the longitudinal axis 112.

As will be explained further herein, the electric machine 200 can be controlled to effect or control the airflow through the secondary bypass flowpath 172. In this way, the electric machine 200 can be controlled to optimize or otherwise improve the thrust contribution of the secondary bypass flowpath 172 or to optimize or otherwise improve the thermal management contribution provided by the secondary bypass flowpath 172, or rather, its interaction with a thermal management system.

As further shown in FIG. 1, optionally, the three-stream engine 100 can include an electric machine 210 mechanically coupled with the HP shaft 136. The electric machine 210 can be a motor, a generator, or a combination motor-generator. Like the electric machine 200, the electric machine 210 can be controlled to effect or control the airflow through the secondary bypass flowpath 172. In this way, the electric machine 210 can be controlled to optimize or otherwise improve the thrust contribution of the secondary bypass flowpath 172 or to optimize the thermal management contribution provided by the secondary bypass flowpath 172.

The electric machine 210 can be directly mechanically connected to the HP shaft 136 (as depicted via the solid lines), or alternatively, the electric machine 210 can be mechanically coupled with the HP shaft 138 indirectly, e.g., by way of a gearbox 212 (as shown by the phantom lines). The directly-coupled electric machine 210 can be embedded within the three-stream engine 100 aft of the LP compressor 126 and forward of the HP compressor 128 along the axial direction A. The directly-coupled electric machine 210 can be positioned inward of the core flowpath 142 along the radial direction R. The indirectly-coupled electric machine 210 and its associated gearbox 212 can be positioned within the core cowl 122 and located outward of the core flowpath 142 along the radial direction R.

Figure 4:
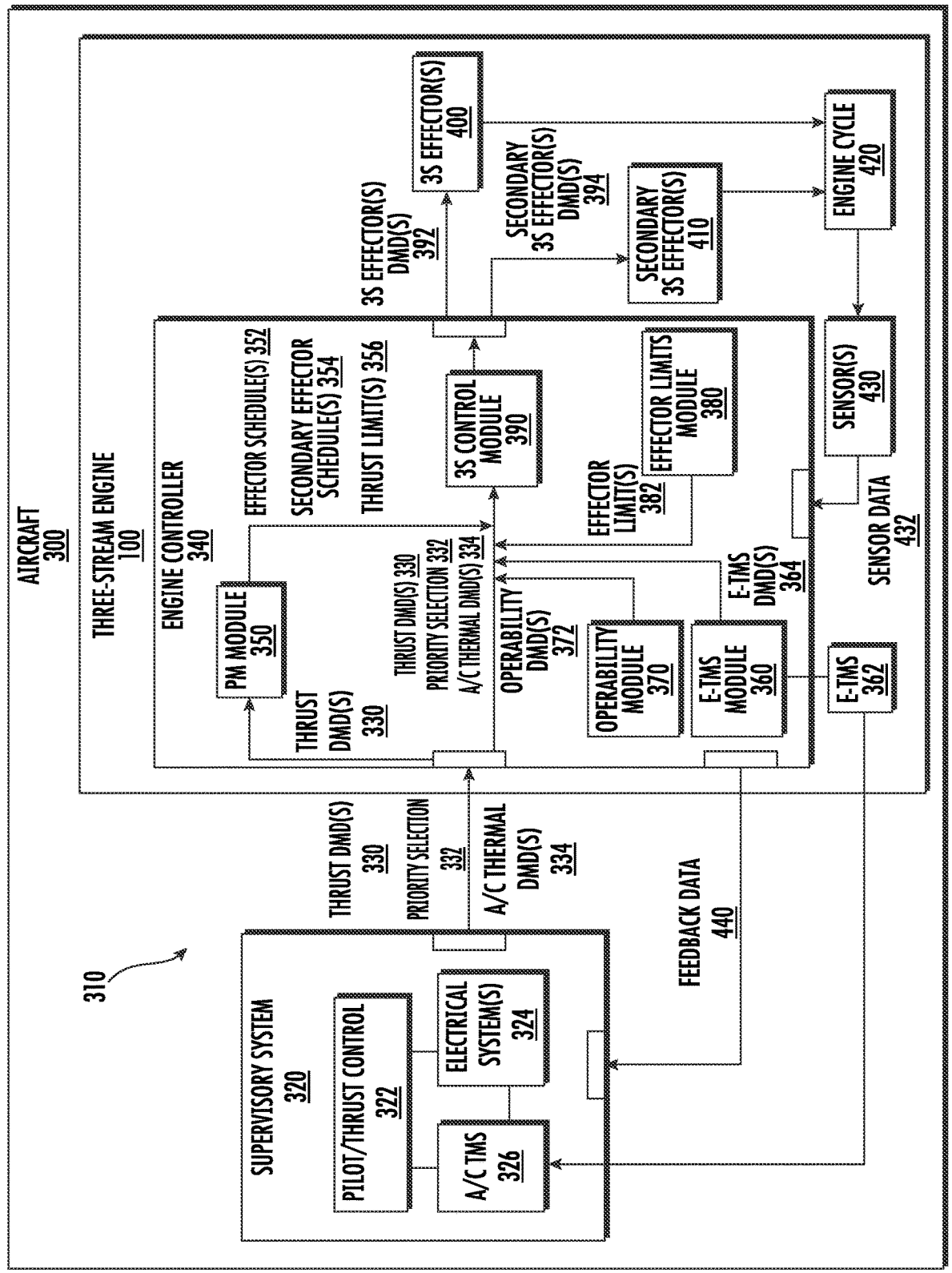
FIG. 4 provides a system diagram of a control system for an aircraft according to various embodiments of the present disclosure.

FIG. 4 provides a system diagram of a control system 310 for an aircraft 300 according to various embodiments of the present disclosure. The control system 310 can be used to control one or more components of the three-stream engine 100 mounted to the aircraft 300. While the control system 310 will be described below as being associated with or configured to implement control schemes with respect to the three-stream engine 100 of FIGS. 1 and 2, it will be appreciated that the example control system 310 of FIG. 4 can be associated with or implement control schemes with respect to other three-stream gas turbine engines as well.

The control system 310 includes, among other things, a supervisory system 320 and an engine controller 340 communicatively coupled thereto. The engine controller 340 can be mounted to the three-stream engine 100 while the supervisory system 320 can be located within a fuselage of the aircraft 300, for example. The engine controller 340 is communicatively coupled with one or more third stream effectors 400. Such systems and components can be communicatively coupled in any suitable manner, e.g., via one or more wired or wireless connection links. As will be explained more fully below, the engine controller 340 can control or cause the effector 400 to adjust an airflow through the secondary bypass flowpath 172. In adjusting the airflow through the secondary bypass flowpath 172, one or more properties of the airflow can be adjusted, such as the mass flow, temperature, and/or the pressure. By causing the effector 400 to adjust the airflow through the secondary bypass flowpath 172, the thrust contribution and the thermal management contribution provided by the secondary bypass flowpath 172 can be controlled.

The supervisory system 320 can include one or more processors and one or more memory devices. The one or more processors can perform operations, such as those noted herein. The supervisory system 320 can be configured in a same or similar manner as the computing system 600 provided in FIG. 15. The supervisory system 320 can be communicatively coupled with various systems of the aircraft 300, such as a thrust control 322, one or more electrical systems 324, and an aircraft thermal management system 326, denoted as A/C TMS 326 in FIG. 4. The thrust control 322 can include one or more power or thrust levers positioned within the cockpit or an automated thrust control system, for example. Upon manipulation of the thrust control 322, a desired amount of thrust may be demanded. The supervisory system 320 can receive signals indicating the demanded thrust in response to manipulation of the thrust control 322.

The one or more electrical systems 324 can include any aircraft electrical system that draws or generates electrical power. Example electrical systems 324 include, without limitation, air conditioning systems, cockpit displays, cabin accessories, pumps, etc. The aircraft thermal management system 326 can be in thermal communication with one or more of the electrical systems 324. For instance, the aircraft thermal management system 326 can include one or more heat exchangers, heat sinks, pumps, fluid supply lines, etc. that collectively act to cool one or more components of the electrical systems 324 and potentially other components onboard the aircraft 300. The supervisory system 320 can receive signals indicated the cooling capacity of the aircraft thermal management system 326 and/or signals indicating electrical power demands from the electrical systems 324.

As noted, the supervisory system 320 can receive inputs from the thrust control 322, the electrical systems 324, and/or the aircraft thermal management system 326, among other aircraft systems. Based on these inputs, the supervisory system 320 can generate various outputs, such as a thrust demand 330, denoted as "Thrust DMD(s) 330" in FIG. 4, a priority selection 332 indicating a priority of one or more objectives, and an aircraft thermal demand 334, denoted as "A/C Thermal DMD(s) 334" in FIG. 4. These generated outputs can be routed to the engine controller 340 as shown in FIG. 4.

The engine controller 340 can include one or more processors and one or more memory devices. The one or more processors can perform operations, such as those noted herein. The engine controller 340 can be configured in a same or similar manner as the computing system 600 provided in FIG. 15. As depicted, the engine controller 340 can include various control modules, including a Power Management module 350, denoted as "PM module 350" in FIG. 4. Upon executing the power management module 350, the one or more processors can output schedule demands, such as an effector schedule 352 and optionally a secondary effector schedule 354, based at least in part on the thrust demand 330, which may be received from the supervisory system 320. The effector schedules 352, 354 can be selected or determined so as to optimize or otherwise improve performance of the three-stream engine 100, for example. In other embodiments, the thrust demand 330 may not be routed through a supervisory system.

Moreover, upon executing the power management module 350, the one or more processors can output one or more thrust limits 356. The one or more thrust limits 356 can indicate a minimum thrust limit, e.g., a minimum thrust required to maintain aircraft controllability. The one or more thrust limits 356 can also indicate a maximum thrust limit, e.g., to prevent the three-stream engine 100 from exceeding its redline speed. The effector schedule 352, 354 and/or the thrust limits 356 can be based on one or more operating parameters in addition to the thrust demand 330. For instance, the effector schedule 352 and/or the thrust limit 356 can be output based on the thrust demand 330 and a temperature at a station of the three-stream engine 100, e.g., a temperature at engine station T2 or at the inlet 176 of the secondary bypass flowpath 172.

The engine controller 340 can also include an engine thermal management system module 360 associated with an engine thermal management system 362, denoted in FIG. 4 as E-TMS module 360 and E-TMS 362, respectively. The engine thermal management system 362 can include one or more heat sinks, heat exchangers, fluid supply lines, pumps, etc. For instance, the engine thermal management system 362 can include the heat exchangers 230 depicted in FIG. 2. In some embodiments, the engine thermal management system 362 is coupled to or integrated with the aircraft thermal management system 326, e.g., as shown in FIG. 4. In other embodiments, the engine thermal management system 362 and the aircraft thermal management system 326 are separate systems. Upon executing the engine thermal management system module 360, the one or more processors can output engine thermal demands 364, denoted as "E-TMS DMD(s) 364" in FIG. 4. The engine thermal demands 364 can indicate that more or less cooling capability is needed, for example.

Further, the engine controller 340 can include an operability module 370. Upon executing the operability module 370, the one or more processors can output one or more operability demands 372, denoted as "OPERABILITY DMD(s) 372" in FIG. 4. The operability module 370 can include various models, tables, etc. relating to operability of the three-stream engine 100 for various operating conditions. Generally, the operability demands 372 can indicate various operating margins limits or lines (e.g., stall margin, surge lines, rotating stall lines) that the three-stream engine 100 must meet in order to maintain operability. The operability demands 372 can be specifically associated with operability of a particular component. In some instances, for example, the operability demands 372 can include an operability demand associated with operability of the mid-fan 190, an operability demand associated with operability of the LP compressor 126, and an operability demand associated with operability of the HP compressor 128.

The engine controller 340 can also include an effector limits module 380. Upon executing the effector limits module 380, the one or more processors can output effector limits 382. The effector limits 382 can indicate the hardware limitations or constraints of the effector 400. For instance, in one example embodiment, the effector 400 can include an array of vanes and an actuator for modulating the position of the vanes. The actuator can define a stroke ranging between a fully retracted position and a fully extended position. The effector limits can indicate these positions as constraints so that the actuator is not physically moved past its designed limits.

As shown in FIG. 4, the engine controller 340 includes a third stream control module 390, denoted as "3S CONTROL MODULE 390" in FIG. 4. The demands 330, 334, 364, 372, schedules 352, 354, limits 356, 382, and priority selection 332 can be input into the third stream control module 390. Particularly, the effector and secondary effector schedules 352, 354 and thrust limits 356 output from the power management module 350, the engine thermal demand 364 output from the engine thermal management system module 360, the operability demands 372 output from the operability module 370, effector limits 382 output from the effector limits module 380, and the priority selection 332 and aircraft thermal demands 334 received from the supervisory system 320 can be input into the third stream control module 390. In executing the third stream control module 390, the one or more processors can output third stream effector demands 392, denoted as "3S EFFECTOR DMD(s) 392" in FIG. 4, based at least in part on one or more of the demands 330, 334, 364, 372, schedules 352, 354, limits 356, 382, and priority selection 332.

The effector demands 392 can be routed to the effector 400, and in response to the third stream effector demands 392, the effector 400 can cause adjustment of the airflow through the secondary bypass flowpath 172. As noted, adjusting the airflow through the secondary bypass flowpath 172 can be an adjustment of one or more properties of the airflow, such as the mass flow, temperature, and/or the pressure. In some embodiments, the secondary effector demands 394 can be routed to the secondary effector 410, and in response to the secondary effector demands 394, the secondary effector 410 can assist with adjustment of the airflow through the secondary bypass flowpath 172 to achieve a desired thrust or thermal contribution. Upon causing the effector 400, and in some instances the secondary effector 410, to adjust the airflow through the secondary bypass flowpath 172, one or more engine cycles can be performed, denoted at block 420 in FIG. 4.

One or more sensors 430 of the three-stream engine 100 and/or aircraft 300 can capture one or more operating parameters associated with the three-stream engine 100 and/or aircraft 300, a current position of the effector 400 and/or secondary effector 410, and various constraints during the one or more engine cycles performed at block 420. Sensor data 432 including such captured data can be fed back to the engine controller 340 as shown in FIG. 4. Such sensor data 432 can be utilized by the one or more modules 350, 360, 370, 380, 390 of the engine controller 340. For instance, the compressor discharge pressure or pressure at the inlet of the HP compressor 128 can be captured and fed back to the operability module 370 so that, when executed, the operability module 370 can output an operability demand 372 that reflects the actual operating conditions within the three-stream engine 100. Moreover, the temperature of the airflow flowing through the secondary bypass flowpath 172 can be captured and fed to the engine thermal management system module 360 so that, when executed, the engine thermal management system module 360 can output an engine thermal demand 364 that reflects the actual operating conditions within the secondary bypass flowpath 172, and accordingly, can demand more or less cooling to achieve a desired thermal target. The sensor data 432 can also include other feedback, such as the rotational speed of one or more of the shafts 136, 138 (potentially corrected by an engine temperature at a particular engine station), an electrical characteristic associated with the electric machine 200 (e.g., a voltage or electric current associated with the electric machine 200), etc., as well as other sensor inputs that may facilitate deriving certain parameters, such as an engine pressure ratio and/or an exhaust gas temperature.

As further shown in FIG. 4, the engine controller 340 can provide feedback data 440 to the supervisory system 320. Specifically, thrust feedback, thermal feedback, and electric feedback, among other possible feedback, can be provided to the supervisory system 320 by the engine controller 340. The thrust feedback can indicate a predicted thrust output of the three-stream engine 100. In some instances, the thrust feedback can also specifically indicate the thrust output from the secondary bypass flowpath 172. The thermal feedback can indicate a cooling capacity of one or more heat sinks associated with the engine thermal management system 362, for example. The electric feedback can indicate one or more characteristics associated with the electrical systems or components of the three-stream engine 100. For instance, the voltage or electric current associated with the electric machine 200 can be fed back to the supervisory system 320. The supervisory system 320 can utilize the feedback data 440 in generating demands, e.g., for a subsequent timestep of the control system 310.

With the control system 310 described generally, an example manner in which the one or more processors of the engine controller 340 can cause the effector 400 to adjust the airflow through the secondary bypass flowpath 172 will now be provided. For this example embodiment, the effector 400 is the array of inlet guide vanes 240 positioned upstream of the mid-fan 190. In causing the array of inlet guide vanes 240 to adjust the airflow through the secondary bypass flowpath 172, the one or more processors of the engine controller 340 are configured to cause adjustment of a pitch of the inlet guide vanes 240 about their respective central vane axes 242. For instance, based on the third-stream effector demands 392 output from the engine controller 340, the actuator 244 can collectively pitch the inlet guide vanes 240 about their respective central vane axes 242. Consequently, the airflow through the secondary bypass flowpath 172 is adjusted. That is, at least one of the mass flow, temperature, and pressure of the airflow through the secondary bypass flowpath 172 is adjusted by moving the position of the inlet guide vanes 240.

Figure 5:
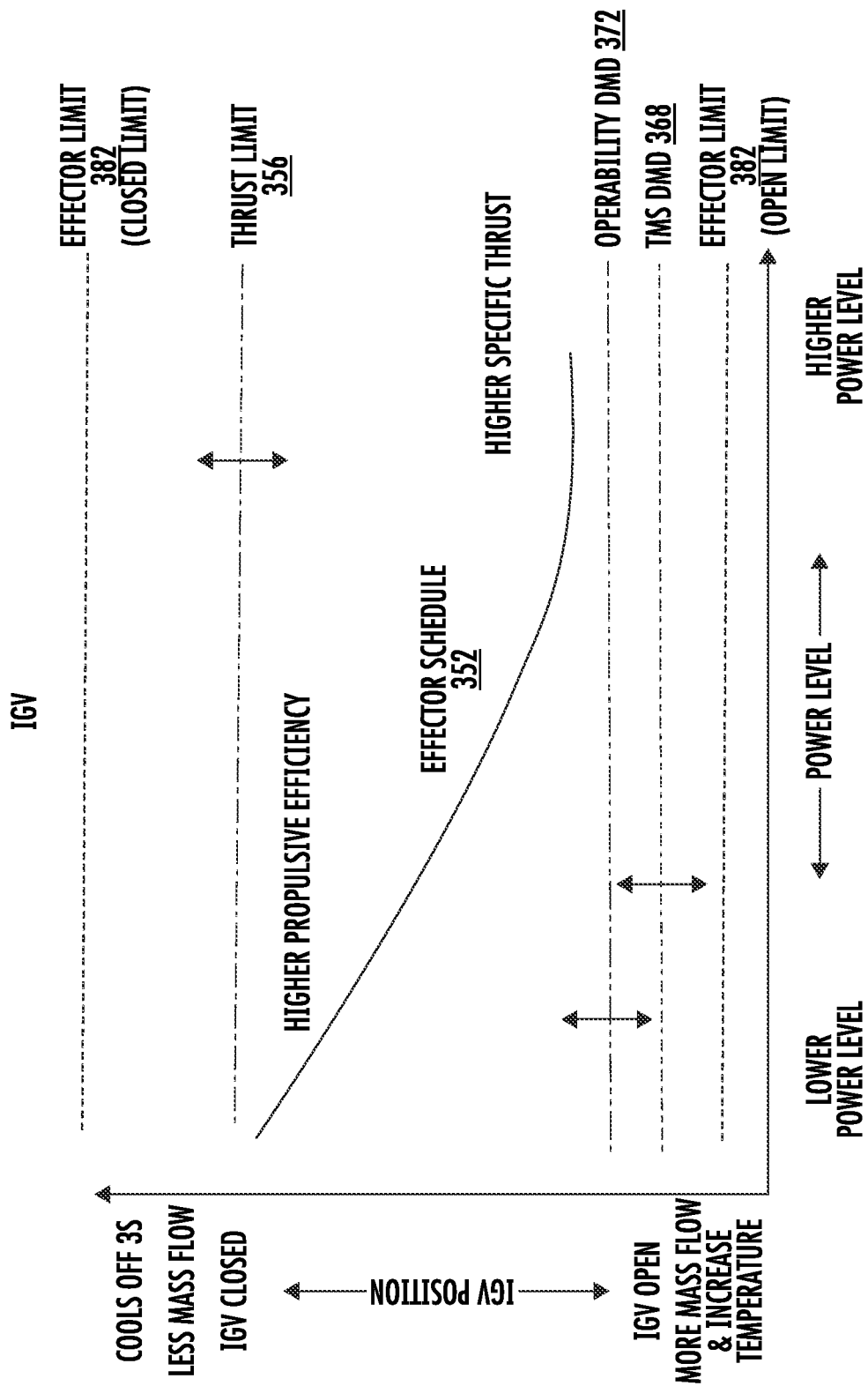
FIG. 5 provides a graph depicting inlet guide vane position scheduled as a function of a power level of the three-stream engine of FIGS. 1 and 2.

With reference now to FIGS. 1, 2, 4, and 5, the one or more processors of the engine controller 340 can cause the array of inlet guide vanes 240 to adjust the airflow through the secondary bypass flowpath 172 in accordance with the demands 330, 334, 364, 372, schedules 352, 354, limits 356, 382, and priority selection 332 provided to the third stream control module 390. Particularly, FIG. 5 graphically depicts inlet guide vane position scheduled as a function of a power level of the three-stream engine 100. An effector schedule 352 associated with the inlet guide vane position is depicted as a function of power level. The effector schedule 352 can be generated and output by execution of the power management module 350 as depicted in FIG. 4. For this embodiment, the effector schedule 352 has a negative exponential shape as depicted in FIG. 5. The effector schedule 352 is a default or base schedule that the effector demands 392 are generated in accordance with unless the effector schedule 352 is constrained by another demand or limit.

In accordance with the effector schedule 352, the lower the power level of the three-stream engine 100, the more closed the inlet guide vanes 240 are moved. Moving the inlet guide vanes 240 more closed decreases the mass flow of the airflow through the secondary bypass flowpath 172 and also cools the temperature of the airflow therethrough. Lower power levels are associated with higher propulsive efficiency of the three-stream engine 100 as indicated in FIG. 5. In contrast, in accordance with the effector schedule 352, the higher the power level of the three-stream engine 100, the more open the inlet guide vanes 240 are moved. Moving the inlet guide vanes 240 to a more open position increases the mass flow of the airflow through the secondary bypass flowpath 172 and also increases the temperature of the airflow therethrough. Higher power levels are associated with higher specific thrust of the three-stream engine 100 as also indicated in FIG. 5.

As further shown in FIG. 5, in addition to the effector schedule 352, various demands and limits are depicted. Particularly, the operability demand 372, a thermal demand 368, the thrust limit 356, and the effector limits 382 are depicted. The thermal demand 368, operability demand 372, and thrust limit 356 are movable along the y-axis of the graph as represented by the double-sided arrows positioned adjacent the operability demand 372, the thermal demand 368, and the thrust limit 356. Specifically, the thermal demand 368 is movable along the y-axis of the graph based on inputs from the aircraft thermal management system 326 and/or the engine thermal management system 362. The thermal demand 368 can be a summation of the engine thermal demand 364 and the aircraft thermal demand 334, for example. If additional cooling is demanded, for instance, the thermal demand 368 can be moved upward along the y-axis. This may, for example, increase the cooling capacity of the heat exchangers 230 positioned in the secondary bypass flowpath 172. In contrast, if less cooling is demanded, the thermal demand 368 can be moved downward along the y-axis of the graph.

The operability demand 372 is movable along the y-axis of the graph based on the sensor data 432 indicating one or more operating parameters associated with the three-stream engine 100, such as the rate of change of the compressor discharge pressure or pressure at the inlet of the HP compressor 128. The thrust limit 356 is movable along the y-axis of the graph based on the sensor data 432 indicating one or more operating parameters associated with the three-stream engine 100, such as the temperature or pressure at a station of the engine. The effector limits 382 are fixed constraints in this example embodiment. The effector limits 382 include an open limit and a closed limit in this example.

In some embodiments, the position of the inlet guide vanes 240 is selected in accordance with the effector schedule 352 unless other demands and/or limits intersect with or are selected as being of higher priority, which may cause the position of the inlet guide vanes 240 to deviate from the effector schedule 352. The priority of the demands and/or limits may be preselected, e.g., by the supervisory system 320 and/or the engine controller 340. Examples are provided below.

EXAMPLE 1: As a first example, with reference to FIG. 6 in addition to FIGS. 1, 2, 4, and 5, FIG. 6 provides a graph depicting inlet guide vane position as a function of time. In this example, the power level of the three-stream engine 100 remains constant, and thus, the effector schedule 352 is shown as a constant function. Further, for this example, the supervisory system 320 and/or engine controller 340 seeks to prioritize the cooling of various components of the aircraft 300. Accordingly, at time t1, the thermal demand 368 begins to increase, which represents a demand for increased cooling capacity. Also, before and at time t1, the position of the inlet guide vanes 240 is set in accordance with the effector schedule 352, as represented by the effector demand 392 tracing over the effector schedule 352 prior to and at time t1. The effector demand 392 is shown in dashed lines in FIG. 6.

At time t2, the thermal demand 368 intersects with the effector schedule 352 and continues to increase thereafter. The intersection of the thermal demand 368 with the effector schedule 352 indicates that the thermal demand 368 is of higher priority than the effector schedule 352. Notably, at time t2, the effector demand 392 begins to trace along the thermal demand 368 rather than the effector schedule 352. In accordance with the effector demands 392, the inlet guide vanes 240 are moved or pitched about their respective central vanes axes 242. In this instance, to meet the increase in thermal demand, the inlet guide vanes 240 are pitched to a more closed position, which reduces the temperature and mass flow of the airflow through the secondary bypass flowpath 172. Advantageously, this may increase the rate of thermal exchange between the heat exchangers 230 and the airflow through the secondary bypass flowpath 172. The inlet guide vanes 240 are gradually pitched more closed from time t2 to time t3.

At time t3, the thermal demand 368 and effector demand 392 tracing along the thermal demand 368 intersect with the thrust limit 356. To avoid passing the thrust limit 356, at t3, the effector demand 392 begins to trace along the thrust limit 356 even though the thermal demand 358 continues to increase after time t3. As shown, the effector demand 392 and consequently the position of the inlet guide vanes 240 is held for a time at the thrust limit 356 (until time t5) to provide the coolest possible airflow through secondary bypass flowpath 172 whilst not affecting the ability of the three-stream engine 100 to maintain aircraft controllability. While the thrust contribution from the secondary bypass flowpath 172 is sacrificed somewhat when the inlet guide vanes 240 are moved more closed, the thermal contribution that the secondary bypass flowpath 172 provides to one or more thermal management systems can be increased.

Figure 6:
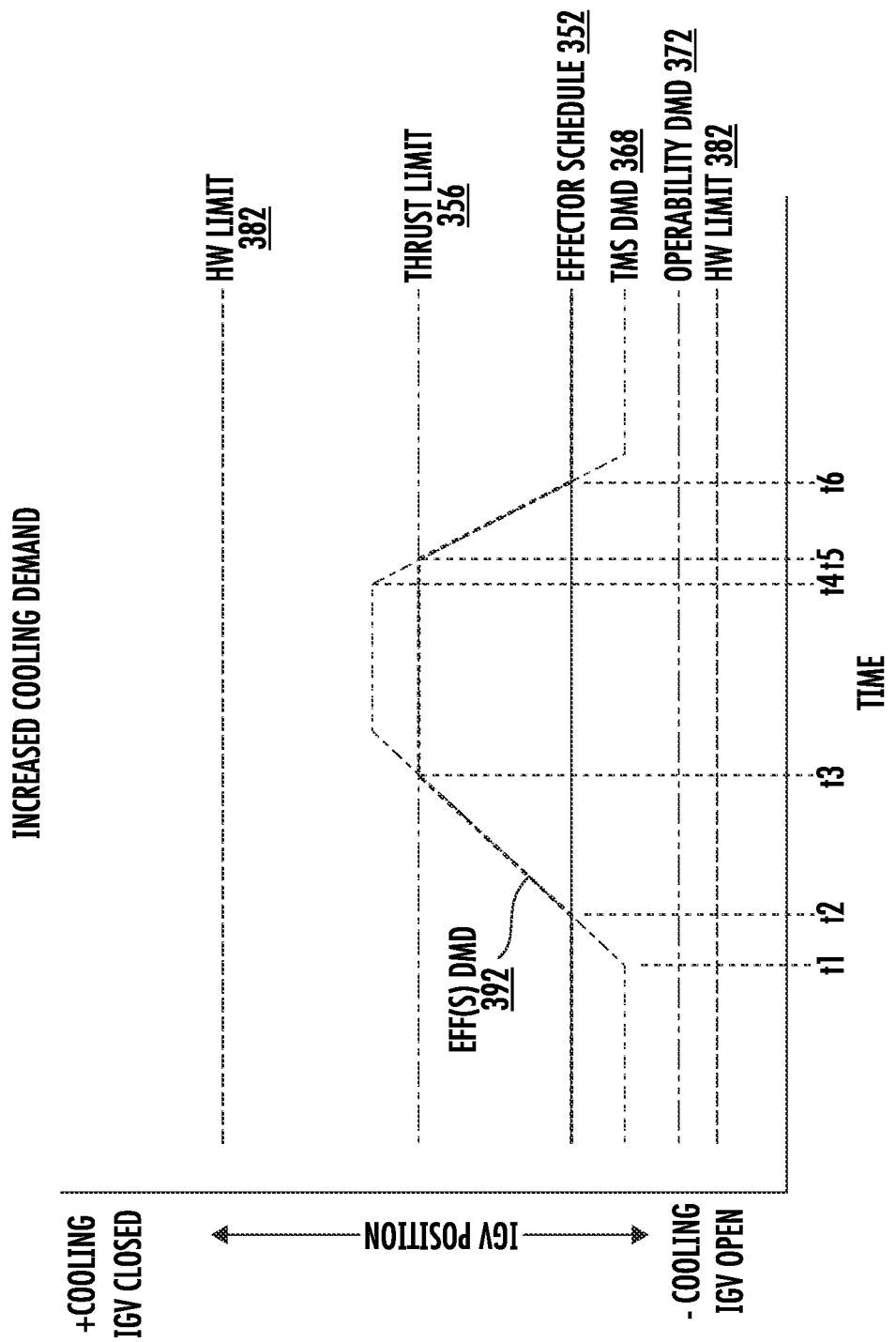
FIG. 6 provides a graph depicting inlet guide vane position as a function of time in response to an increased thermal demand according to one example embodiment of the present disclosure.

At time t4, the increased thermal demand for one or more of the thermal management systems of the aircraft 300 is no longer needed. Thus, at t4, the thermal demand 368 starts to decrease. The thermal demand 368 can be decreased linearly as shown in FIG. 6. At time t5, the thermal demand 368 intersects with the thrust limit 356 and the effector demand 392 tracing along the thrust limit 356. As less cooling is needed, at time t5, the effector demand 392 begins to trace along the thermal demand 368 rather than the thrust limit 356. In accordance with the effector demands 392, the inlet guide vanes 240 are moved or pitched about their respective axes 242. In this instance, to meet the decrease in thermal demand 368 and to increase the thrust contribution provided by the secondary bypass flowpath 172, the inlet guide vanes 240 are pitched to a more open position, which increases the temperature and mass flow of the airflow through the secondary bypass flowpath 172. The inlet guide vanes 240 are gradually pitched more open from time t5 to time t6.

At time t6, the thermal demand 368 intersects once again with the effector schedule 352. Thus, the effector demand 392 begins to trace along the effector schedule 352 rather than the thermal demand 368 at time t6. This allows for optimization or improvement of the thrust contribution provided by the secondary bypass flowpath 172 whilst still providing a nominal thermal contribution. In accordance with the effector demands 392, the inlet guide vanes 240 are no longer moved more open but rather are held in position at time t6.

Figure 7:
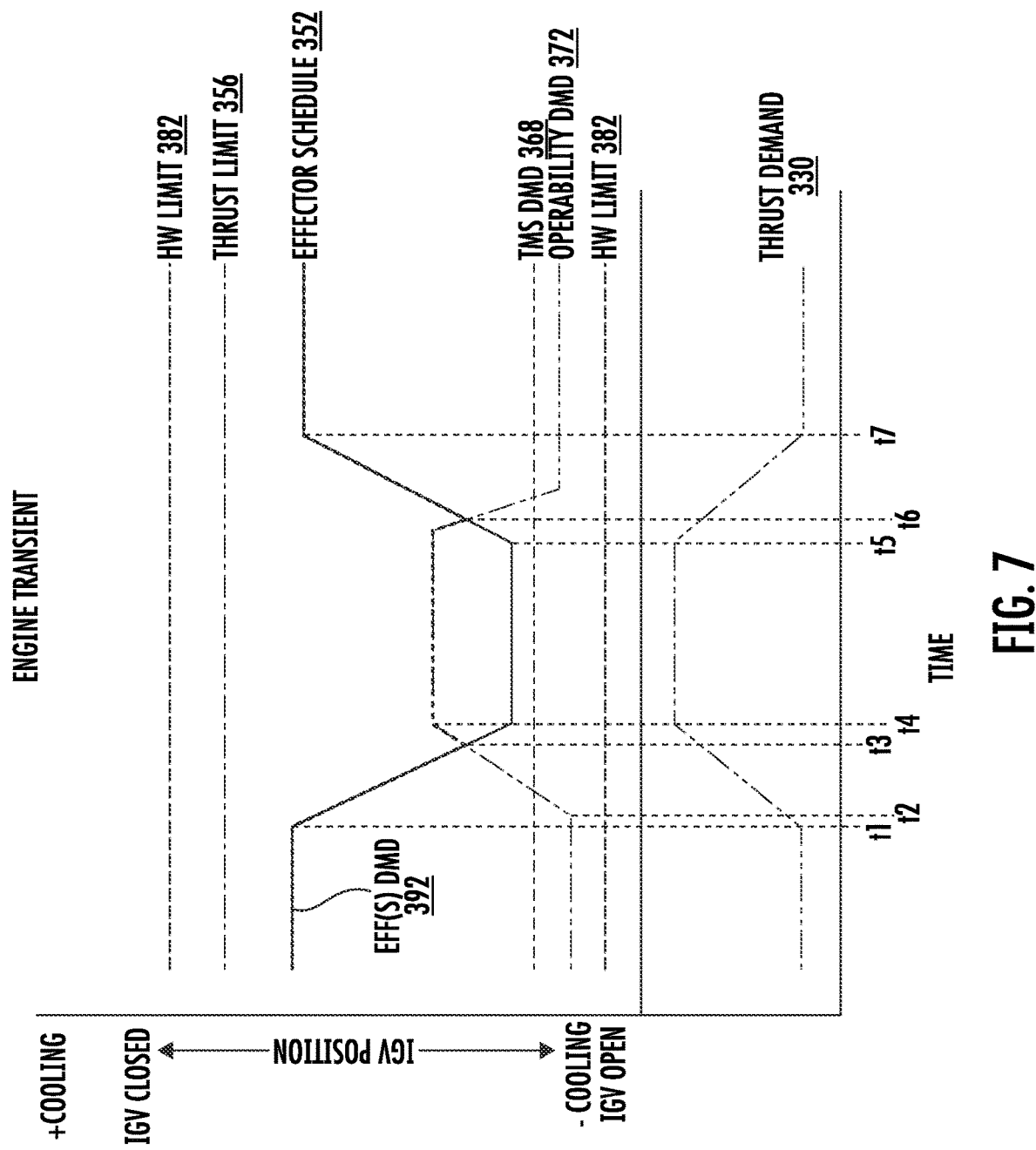
FIG. 7 provides a graph depicting inlet guide vane position as a function of time in response to an increased thrust demand according to one example embodiment of the present disclosure.

EXAMPLE 2: As a second example, with reference to FIG. 7 in addition to FIGS. 1, 2, 4, and 5, FIG. 7 provides a graph depicting inlet guide vane position as a function of time as well as a thrust demand 330 as a function of time. In this example, the power level of the three-stream engine 100 does not remain constant. Rather, the three-stream engine 100 is subjected to an engine transient. Particularly, as depicted in FIG. 7, the thrust demand 330 increases at time t1. This causes the effector schedule 352 to decrease along the y-axis at time t1. As the effector demand 392 traces along the effector schedule 352, at time t1, the inlet guide vanes 240 are moved more open to increase the mass flow and temperature of the air flowing through the secondary bypass flowpath 172, thereby increasing the thrust contribution provided by the secondary bypass flowpath 172 to the net propulsive thrust. As a result of the increase thrust demanded at time t1, at time t2, the operability demand 372 begins to increase along the y-axis, e.g., as the compressor operating line moves closer to the surge line or stall line. The thrust demand 330 increases to time t4.

At time t3, the operability demand 372 intersects with the effector schedule 352. To prevent inoperability of the three-stream engine 100, the effector demand 392 is determined as being of higher priority and begins to trace along the operability demand 372 instead of the effector schedule 352. Consequently, at time t3, in accordance with the effector demand 392, the inlet guide vanes 240 cease moving to a more open position and move more closed to decrease the mass flow of the air flowing through the secondary bypass flowpath 172. This may ensure operability of the three-stream engine 100.

At time t4, the thrust demand 330 is no longer increasing. Thus, the operability demand 372 ceases to increase along the y-axis of the graph. The thrust demand 330 is held constant from time t4 to time t5. At time t5, a decrease in thrust is demanded as represented by the decreasing thrust demand 330. When the thrust demand 330 decreases at time t5, the operability demand 372 begins to decrease along the y-axis of the graph, e.g., as the compressor operating line moves away from the surge line or stall line.

At time t6, the operability demand 372 intersects with the effector schedule 352 once again. Thus, at time t6, the effector demand 392 begins to trace along the effector schedule 352 rather than the operability demand 372. As less thrust is demanded, at time t6, in accordance with the effector demand 392, the inlet guide vanes 240 are moved to a more closed position, which decreases the mass flow and temperature of the air flowing through the secondary bypass flowpath 172. At time t7, the effector schedule 352 ceases increasing along the y-axis as the thrust demand 330 ceases decreasing.

Figure 8:
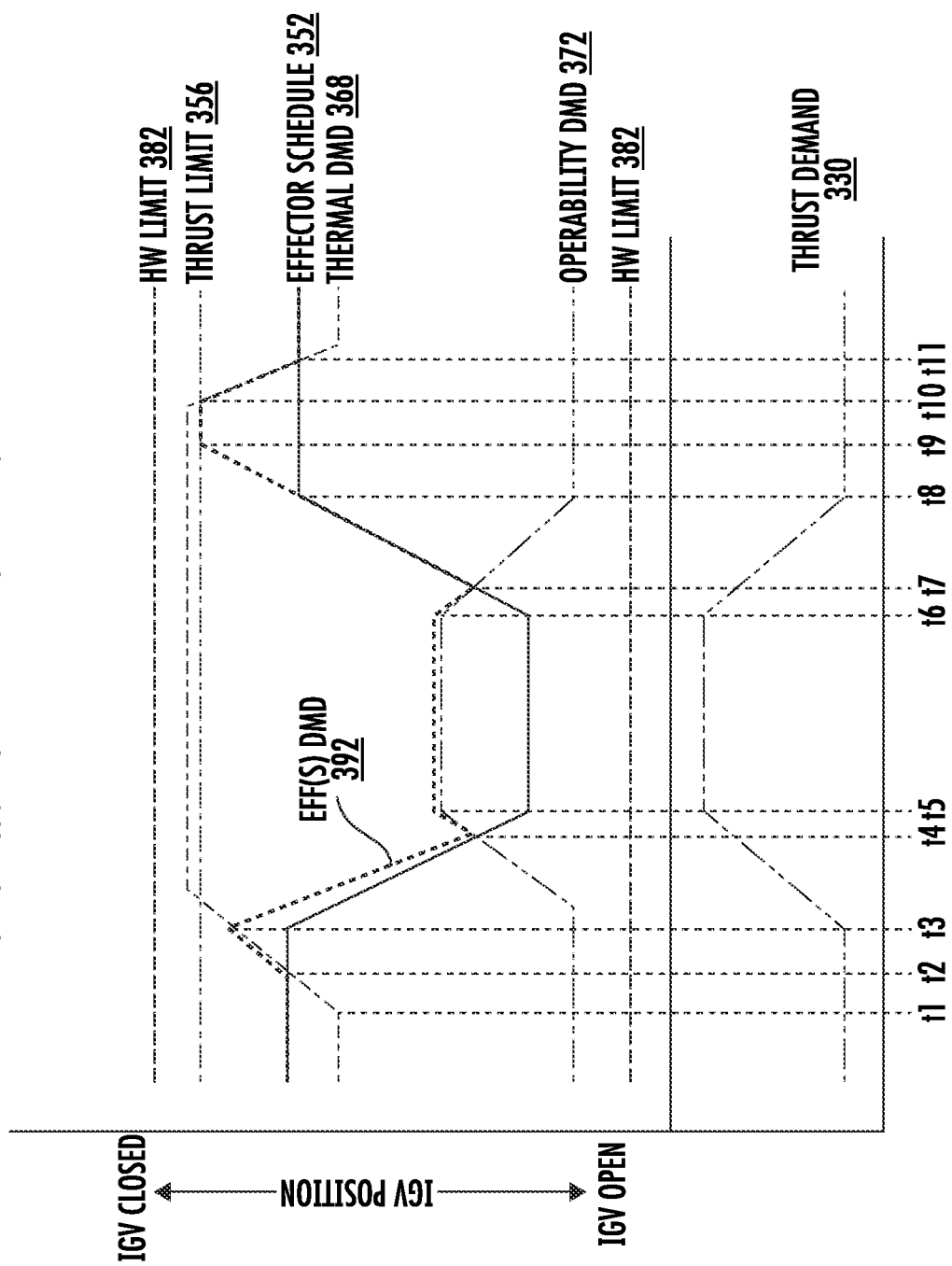
FIG. 8 provides a graph depicting inlet guide vane position as a function of time in response to an increased thermal demand and an increased thrust demand according to one example embodiment of the present disclosure.

EXAMPLE 3: As a third example, with reference to FIG. 8 in addition to FIGS. 1, 2, 4, and 5, FIG. 8 provides a graph depicting inlet guide vane position as a function of time as well as a thrust demand 330 as a function of time. In this example, increased cooling is demanded and the power level of the three-stream engine 100 is subjected to an engine transient. As depicted in FIG. 8, at time t1, an increased amount of cooling is demanded as reflected by the thermal demand 368 increasing along the y-axis of the graph. Prior to and at time t1, the effector demand 392 traces along the effector schedule 352. At time t2, the increasing thermal demand 368 intersects with the effector schedule 352. Accordingly, the effector demand 392 begins to trace along the thermal demand 368 rather than the effector schedule 352 at time t2. In accordance with the effector demand 392, the inlet guide vanes 240 are moved to a more closed position, which cools down the air flowing through the secondary bypass flowpath 172 thereby increasing the cooling capacity of the heat exchangers 230.

At time t3, the thrust demand 330 increases, e.g., in response to a pilot manipulating the thrust control 322. This causes the effector schedule 352 to decrease along the y-axis at time t3. In this example, the supervisory system 320 has made a priority selection 332 indicating that meeting the thrust demand 330 during this transient operation is of higher priority than meeting the thermal demand 368. Accordingly, the effector demand 392 aborts tracing along the thermal demand 368 and returns to follow the effector schedule 352 as safely and quickly as possible. In accordance with the effector demand 392, from time t3 to time t4 the inlet guide vanes 240 are moved to a more open position, which increases the mass flow and temperature of the air flowing through the secondary bypass flowpath 172, which increases the thrust contribution provided by the secondary bypass flowpath 172. As a result of the increase thrust demanded at time t3, the operability demand 372 begins to increase along the y-axis, e.g., as the compressor operating line moves closer to the surge line or stall line. The thrust demand 330 increases to time t5.

At time t4, as the effector demand 392 traces along the effector schedule 352, the operability demand 372 intersects with the effector schedule 352. To prevent inoperability of the three-stream engine 100, the effector demand 392 begins to trace along the operability demand 372 instead of the effector schedule 352. Consequently, at time t4, in accordance with the effector demand 392, the inlet guide vanes 240 cease moving to a more open position and move more closed to decrease the mass flow of the air flowing through the secondary bypass flowpath 172.

At time t5, the thrust demand 330 is no longer increasing. Thus, the operability demand 372 ceases to increase along the y-axis of the graph. The thrust demand 330 is held constant from time t5 to time t6. At time t6, a decrease in thrust is demanded as represented by the decreasing thrust demand 330. When the thrust demand 330 decreases at time t6, the operability demand 372 begins to decrease along the y-axis of the graph, e.g., as the compressor operating line moves away from the surge line or stall line.

At time t7, the operability demand 372 intersects with the effector schedule 352 once again. Thus, at time t7, the effector demand 392 begins to trace along the effector schedule 352 rather than the operability demand 372. As less thrust is demanded, at time t7, in accordance with the effector demand 392, the inlet guide vanes 240 are moved to a more closed position, which decreases the mass flow and temperature of the air flowing through the secondary bypass flowpath 172.

At time t8, the thrust demand 330 ceases to decrease and levels off. The effector schedule 352 correspondingly ceases to increase along the y-axis of the graph and levels off. As the engine transient operation has completed at time t8 (as reflected by the thrust demand 330) and the thermal demand 368 has still not crossed or re-intersected with the effector schedule 352, the engine controller 340 seeks to meet the thermal demand 368. Thus, the effector demand 392 deviates from the effector schedule 352 and increases along the y-axis to meet the thermal demand 368 at time t8. At time t9, the effector demand 392 reaches the thrust limit 356 before reaching the thermal demand 368. Accordingly, the effector demand 392 traces along the thrust limit 356 instead of the thermal demand 368 so as not to negatively affect the controllability of the aircraft 300.

After time t9 and before time t10, less thermal demand 368 is requested, and thus the thermal demand 368 begins to decrease along the y-axis of the graph. At time t10, the thermal demand 368 intersects with the thrust limit 356. Accordingly, the effector demand 392 begins to trace along the thermal demand 368 at time t10. The thermal demand 368 continues to decrease after time t10. In accordance with the effector demand 392, this causes the inlet guide vanes 240 to move to a more open position. At time t11, the thermal demand 368 intersects with the effector schedule 352. As a result, the effector demand 392 begins to trace along the effector schedule 352.

EXAMPLE 1, EXAMPLE 2, and EXAMPLE 3 provide example manners in which the engine controller 340 can control the effector 400, or array of inlet guide vanes 240 in these example embodiments, to cause adjustment of the airflow through the secondary bypass flowpath 172. Particularly, the one or more processors of the engine controller 340 are configured to: determine an effector demand 392 based at least in part on an interaction between: i) the effector schedule 352 determined based at least in part on the thrust demand 330, the thrust demand 330 being associated with thrust to be produced by the three-stream engine 100; ii) the thermal demand 368 associated with a thermal management system coupled to or integrated with the three-stream engine 100; iii) the operability demand 372 associated with operability of the three-stream engine 100; and iv) the thrust limit 356 associated with controllability of the aircraft 300. Accordingly, in such embodiments, the one or more processors are configured to cause the effector 400 to adjust an airflow through the secondary bypass flowpath 172 based at least in part on the effector demand 392. The effector demand 392 can be determined in accordance with the effector schedule 352 unless one of the demands or limits is selected or determined as being of higher priority, for example.

Stated another way, the one or more processors of the engine controller 340 are configured to: determine an effector demand 392 based at least in part on an effector schedule 352 and one or more constraints, the effector schedule 352 being determined based at least in part on the thrust demand 330 associated with thrust to be produced by the three-stream engine 100, the one or more constraints including at least one of: i) the thermal demand 368 associated with a thermal management system coupled to or integrated with the three-stream engine 100; ii) an operability demand 372 associated with operability of the three-stream engine 100; and iii) the thrust limit 356 associated with controllability of the aircraft 300. The one or more processors of the engine controller 340 are configured to cause the effector 400 to adjust an airflow through the secondary bypass flowpath 172 based at least in part on the effector demand 392.

In accordance with the inventive aspects of the present disclosure, the effector 400 can be or can include other components in addition or alternatively to the inlet guide vanes 240. For instance, in some embodiments, the effector 400 can be the variable nozzle 250 positioned along the secondary bypass flowpath 172. In such embodiments, in causing the variable nozzle 250 to adjust the airflow through the secondary bypass flowpath 172, the one or more processors of the engine controller 340 are configured to cause the variable nozzle 250 to change position. For instance, on one hand, when more cooling is needed, the one or more processors of the engine controller 340 can be configured to cause the variable nozzle 250 to move to a more open position. On the other hand, when additional thrust is needed, the one or more processors of the engine controller 340 can be configured to cause the variable nozzle 250 to move to a more closed position. As noted, in FIG. 2, the variable nozzle 250 is shown in the fully open position via solid lines and in the fully closed position via the phantom lines. The variable nozzle 250 can be moved by the actuator 252 to vary the exit area through the secondary bypass outlet 178 in accordance with the effector demand 392 output by the engine controller 340.

Figure 9:
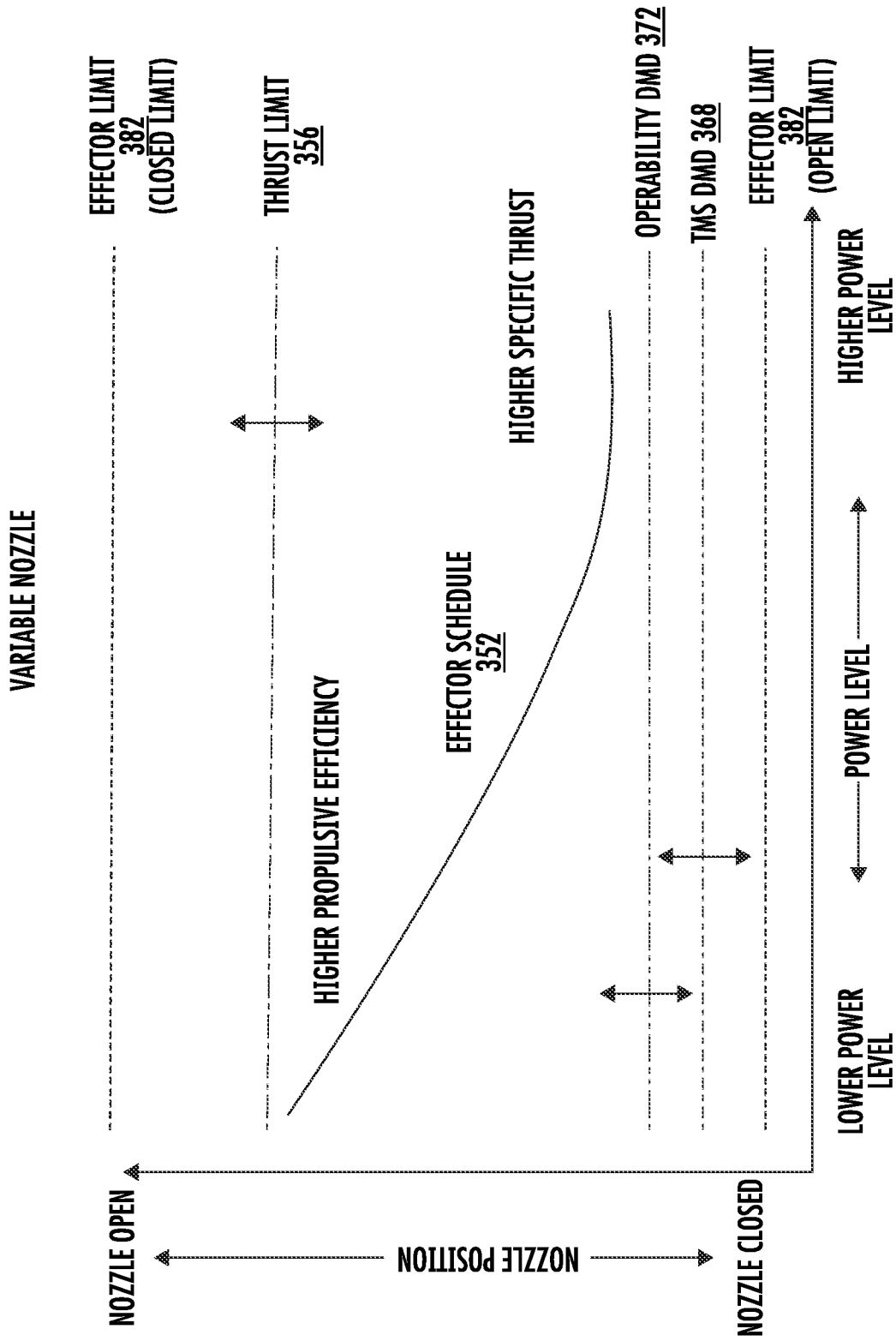
FIG. 9 provides a graph depicting variable nozzle position scheduled as a function of a power level of the three-stream engine of FIGS. 1 and 2.

FIG. 9 provides a graph depicting variable nozzle position scheduled as a function of a power level of the three-stream engine of FIGS. 1 and 2. As depicted, the shape of the effector schedule 352 associated with the variable nozzle position is similar to the shape of the effector schedule 352 associated with the inlet guide vanes depicted in FIG. 5. However, on the y-axis of the graph of FIG. 9, the fully closed position is the minimum position while the fully open position is the maximum position. In contrast, for the inlet guide vane position depicted in FIG. 5, the fully open position is the minimum position while the fully closed position is the maximum position. In this regard, the open and closed positions of the inlet guide vanes and the variable nozzle as they relate to the maximum and minimums are reversed.

As further shown in FIG. 9, the effector limits 382, thrust limit 356, operability demand 372, and thermal demand 368 are graphically represented. In view of the teachings provided herein and the noted differences between how the variable nozzle 250 is to be controlled to provide increased cooling capability or an increased thrust contribution compared to how the inlet guide vanes 240 are controlled to achieve the same, it will be appreciated that the effector demand 392 for the variable nozzle 250 can be generated by the engine controller 340 and the variable nozzle 250 can be controlled in accordance with the effector demand 392 in a same or similar manner described above with respect to control of the inlet guide vanes 240.

In some further embodiments, the effector 400 can include the array of inlet guide vanes 240 positioned upstream of the mid-fan 190 and the variable nozzle 250 positioned along the secondary bypass flowpath 172. In this regard, the engine controller 340 can output effector demands 392 for controlling the inlet guide vanes 240 and effector demands 392 for controlling the variable nozzle 250.

In yet other embodiments, in addition or alternatively to the effector 400 being or including the inlet guide vanes 240, and/or the variable nozzle 250, the effector 400 is or can include the primary fan 152. In such embodiments, in causing the effector 400, or the primary fan 152 in this example, to adjust the airflow through the secondary bypass flowpath 172, the one or more processors of the engine controller 340 are configured to cause at least one of: i) adjustment of a pitch of fan blades 154 of the primary fan 152; and ii) adjustment of a rotational speed of the primary fan 152. In some embodiments, both the pitch of fan blades 154 of the primary fan 152 and the speed of the rotational speed of the primary fan 152 can be adjusted to effect a change in thrust or thermal contribution provided by the secondary bypass flowpath 172.

The one or more processors of the engine controller 340 can cause the one or more actuators 158 to pitch the fan blades 154 about their respective central blade axes 156 to a more open or closed position to effect a change in thrust or thermal contribution provided by the secondary bypass flowpath 172. Moreover, the one or more processors of the engine controller 340 can cause more or less fuel to be provided to the combustor 130, which effectively changes the rotational speed of the LP shaft 138 and consequently the primary fan 152 mechanically coupled thereto.

Figure 10:
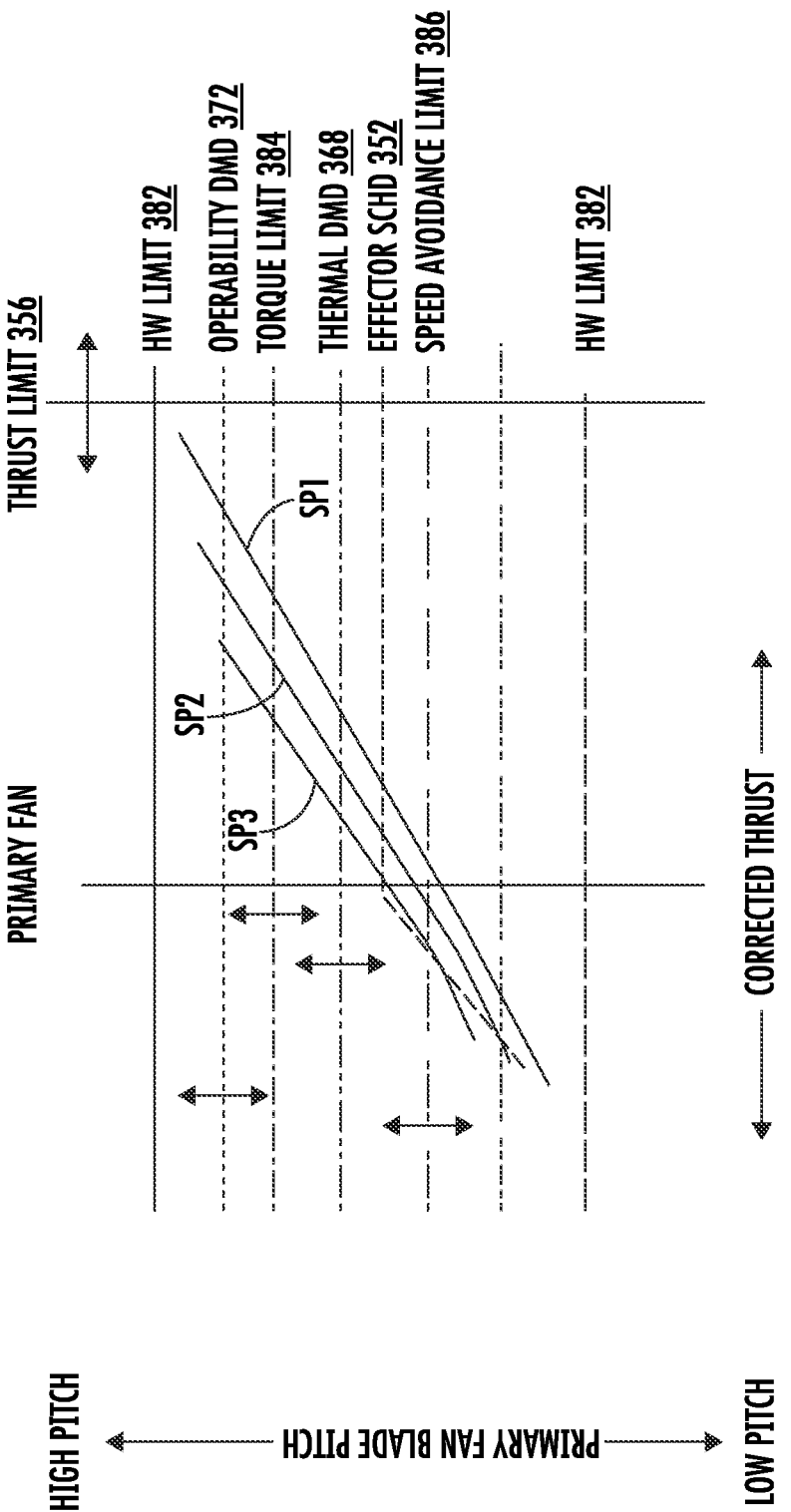
FIG. 10 provides a graph depicting various speed lines scheduled by pitch as a function of a corrected thrust of the three-stream engine of FIGS. 1 and 2.

FIG. 10 provides a contour graph depicting various fan speed lines arranged by pitch as a function of a corrected thrust of the three-stream engine of FIGS. 1 and 2. The pitch of the primary fan blades 154 is represented on the y-axis of the graph of FIG. 10 while the corrected thrust is represented on the x-axis of the graph. There are three example speed contour lines shown, including a first speed line SP1, a second speed line SP2, and a third speed line SP3. The first speed line SP1 represents a higher speed than the second speed line SP2, and the second speed line SP2 represents a higher speed than the third speed line SP3. More or less than three speed lines are contemplated. The speed lines SP1, SP2, SP3 effectively depict various speed/pitch combinations that may achieve a given corrected thrust. It will be appreciated that the contour graph of FIG. 10 may alternatively be presented as various pitch lines arranged by fan speed as a function of a corrected thrust of the three-stream engine of FIGS. 1 and 2.

As further shown in FIG. 10, the effector limits 382, thrust limit 356, operability demand 372, and thermal demand 368 are graphically represented. The thrust limit 356 is movable along the x-axis of the graph of FIG. 10. In addition, for this embodiment, a torque limit 384 and a speed avoidance limit 386 are graphically represented as well. The torque limit 384 and the speed avoidance limit 386 can be output by the effector limits module 380, for example. The torque limit 384 can indicate a maximum torque at which the primary fan 152 may operate before exceeding its designed limit. The speed avoidance limit 386 can indicate a speed at which the primary fan 152 negatively affects the dynamic response of the LP system and/or HP system of the three stream engine 100. For instance, the speed avoidance limit 386 can indicate a speed at which rub events are predicted to occur (a rub event may include the rubbing of a turbine blade on a shroud, for example), a speed at which vibration damage associated with the LP shaft 138 and/or HP shaft 136 are predicted to occur, and/or a speed at which mechanical and/or thermal fatigue is unacceptable. The torque limit 384 and the speed avoidance limit 386 are movable along the y-axis of the graph of FIG. 10 as denoted by the double-sided arrows positioned adjacent thereto.

In view of the teachings provided herein, it will be appreciated that the primary fan 152 can be controlled to provide increased cooling capability or an increased thrust contribution based at least in part on the effector demand 392 (FIG. 4). Particularly, the primary fan 152 can be controlled in accordance with the effector demand 392, e.g., in a same or similar manner described above with respect to control of the inlet guide vanes 240.

In other embodiments, in addition or alternatively to the effector 400 being or including the inlet guide vanes 240, and/or the variable nozzle 250, and/or the primary fan 152, the effector 400 is or can include the electric machine 200 mechanically coupled with the LP shaft 138 and/or the electric machine 210 mechanically coupled with the HP shaft 136. In such example embodiments, in causing the effector 400, or the electric machine 200 and/or electric machine 210 in this example, to adjust the airflow through the secondary bypass flowpath 172, the one or more processors of the engine controller 340 are configured to cause the electric machine 200 to adjust a torque applied to the LP shaft 138 and/or the electric machine 210 to adjust a torque applied to the HP shaft 136. Adjusting the torque applied by the electric machine 200 on the LP shaft 138 affects the rotational speed of the mid-fan 190, which is also mechanically coupled with the LP shaft 138. Adjusting the torque applied by the electric machine 210 on the HP shaft 136 affects the rotational speed of the HP shaft 136.

In some instances, when the electric machine 200 acts as a motor, the one or more processors of the engine controller 340 can cause a drive associated with the electric machine 200 to drive the LP shaft 138 with more or less torque. When more thrust is demanded, for example, the one or more processors can command the drive to cause the electric machine 200 to increase the torque applied on the LP shaft 138. This effectively causes the rotational speed of the mid-fan 190 to increase, causing the properties of the airflow through the secondary bypass flowpath 172 to change, and consequently, the thrust contribution provided by the secondary bypass flowpath 172 to increase. When less thrust is demanded, the one or more processors can command the drive to cause the electric machine 200 to decrease the torque applied on the LP shaft 138. This causes the rotational speed of the mid-fan 190 to decrease, causing the properties of the airflow through the secondary bypass flowpath 172 to change, and as a result, the thrust contribution provided by the secondary bypass flowpath 172 decreases. The thermal contribution provided by the secondary bypass flowpath 172 can be modulated as well by changing the torque applied by the electric machine 200 on the LP shaft 138.

In other instances, such as during cruise operation, the electric machine 200 may act as a generator. In such instances, the one or more processors can cause the electric machine 200 to operate more or less efficiently. This, in effect, causes the electric machine 200 to adjust a torque applied to the LP shaft 138, and consequently, the thrust and/or thermal contribution provided by the secondary bypass flowpath 172.

In some instances, the one or more processors of the engine controller 340 can cause one or both of the electric machine 200 and the electric machine 210 to apply more or less torque on or to their respective shafts 138, 186, which ultimately affects a Power Ratio defined as LP Power/Total Power, wherein the LP Power is the electrical power output by the electric machine 200 and the Total Power is the total electrical power output by the electric machine 200 and the electric machine 210.

Figure 11:
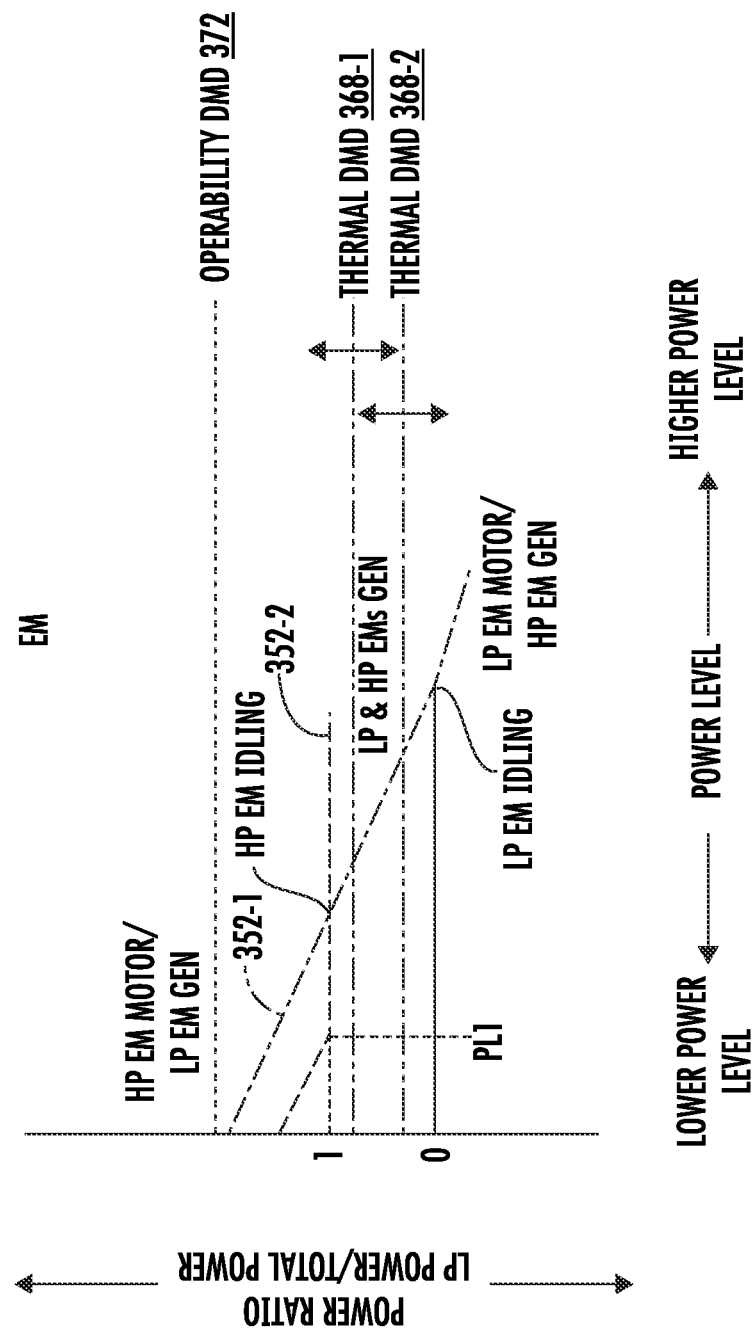
FIG. 11 provides a graph depicting a power ratio scheduled as a function of a power level of the three-stream engine of FIGS. 1 and 2.

FIG. 11 provides a graph depicting various effector schedules provided as a power ratio as a function of a power level of the three-stream engine of FIGS. 1 and 2. Particularly, FIG. 11 provides a first effector schedule 352-1 associated with a first flight condition (e.g., a first altitude) and a second effector schedule 352-2 associated with a second flight condition (e.g., a second altitude) that is different than the first flight condition. More or less than two effector schedules are contemplated. For instance, an effector schedule can be provided for each contemplated flight condition. The effector schedule to be utilized in controlling one or both of the electric machines 200, 210 can be based on the present flight conditions. The effector schedule having a flight condition that most closely matches the present flight condition can be selected, for example.

For the first effector schedule 352-1, for power ratios over 1.0, the electric machine 200 is controlled to generate electrical power and the electric machine 210 is controlled to motor or drive the HP shaft 136. At a power ration of 1.0, the electric machine 200 is controlled to continue generating electrical power and the electric machine 210 is controlled to idle. For power ratios below 1.0 and above 0.0, both electric machines 200, 210 are controlled to generate electrical power. At a power ratio of 0.0, the electric machine 210 is controlled to continue generating electrical power and the electric machine 200 is controlled to idle. For power ratios below 0.0, the electric machine 210 is controlled to generate electrical power and the electric machine 200 is controlled to motor or drive the LP shaft 138.

For the second effector schedule 352-2, for power ratios over 1.0, the electric machine 200 is controlled to generate electrical power and the electric machine 210 is controlled to motor or drive the HP shaft 136. However, at power level PL1 and higher, the slope of the second effector schedule 352-2 flattens out or has a slope of zero, which causes the electric machine 210 to idle, while the electric machine 200 is controlled to continue generating electrical power.

As further shown in FIG. 11, the operability demand 372 and thermal demands are graphically represented. For this embodiment, two thermal demands are depicted, including a first thermal demand 368-1 and a second thermal demand 368-2. The first thermal demand 368-1 and the second thermal demand 368-2 are movable along the y-axis of the graph of FIG. 11 as denoted by the double-sided arrows positioned adjacent thereto. The first thermal demand 368-1 indicates a thermal demand associated with adjusting a power split between the electric machine 200 and the electric machine 210 based on a capability of the secondary bypass flowpath 172 to reject heat produced by the electrical systems associated with the three-stream engine 100 (including the electric machine 200 and/or the electric machine 210) and/or the aircraft 300 (FIG. 4). Essentially, the first thermal demand 368-1 indicates a demand to adjust the power split of the electric machines 200, 210 to adjust the heat produced by the electric machines 200, 210, or rather by adjusting the "hot side". This can be accomplished by looking at the capability of the secondary bypass flowpath 172 (or the capability of heat exchangers therein) to reject heat and also looking at the temperature of the electric machines, their associated thermal busses, etc.

The second thermal demand 368-2 indicates a thermal demand associated with adjusting a power split between the electric machine 200 and the electric machine 210 to influence one or more properties of the airflow through the secondary bypass flowpath 172 to ultimately raise or lower the cooling capability of the secondary bypass flowpath 172. Essentially, the second thermal demand 368-2 indicates a demand to adjust the power split of the electric machines 200, 210 to influence the thermal management capabilities of the secondary bypass flowpath 172, or rather to influence or adjust the "cold side". This can be accomplished by looking at the temperature of the electric machines 200, 210, their associated thermal busses, etc.

In view of the teachings provided herein, it will be appreciated that the electric machine 200 and/or electric machine 210 can be controlled to provide increased cooling capability or an increased thrust contribution or a change in the heat generated thereby based at least in part on the effector demand 392 (FIG. 4). Particularly, the electric machine 200 and/or electric machine 210 can be controlled in accordance with the effector demand 392, e.g., in a same or similar manner described above with respect to control of the inlet guide vanes 240. That is, the effector schedule having a flight condition that most closely matches the present flight condition can be selected and the effector demand can be generated in accordance with the selected effector schedule unless otherwise constrained, e.g., by one of the thermal demands 368-1, 368-2, the operability demand 372, or some other constraint noted herein but not depicted in FIG. 11.

In some further embodiments, optionally, the three-stream engine 100 can include the secondary effector 410 positioned downstream of the mid-fan 190 along the core flowpath 142. The secondary effector 410 can be controlled to assist or facilitate adjustment of the airflow through the secondary bypass flowpath 172 in conjunction with one or more of the disclosed effectors 400. In such embodiments, as will be explained further below, the one or more processors of the engine controller 340 are configured to cause the secondary effector 410 to assist with adjustment of the airflow through the secondary bypass flowpath 172 based at least in part on the secondary effector demand 394.

For instance, in some example embodiments, the three-stream engine 100 can include a compressor having one or more stages of compressors rotor blades and compressor stator vanes, wherein at least one stage of compressor stator vanes are variable stator vanes. For instance, as shown in FIGS. 1 and 2, the LP compressor 126 includes one or more stages of compressors rotor blades and compressor stator vanes, and notably, at least one stage of the compressor stator vanes are variable compressor stator vanes. Particularly, the variable compressor stator vanes are the variable booster inlet guide vanes 260. For this embodiment, the secondary effector can be or can include the booster inlet guide vanes 260.

Figure 12:
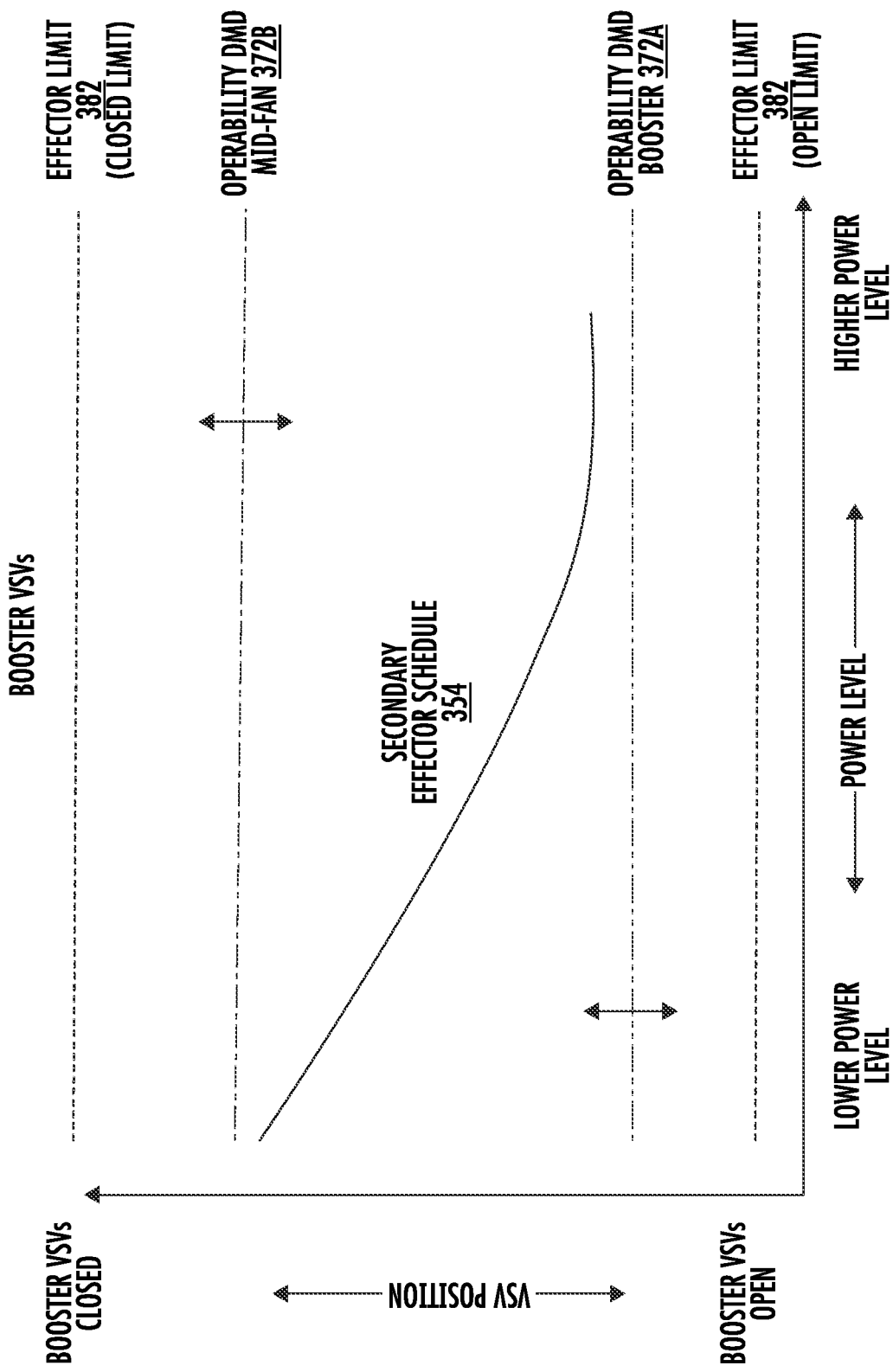
FIG. 12 provides a graph depicting booster variable stator vane position scheduled as a function of a power level of the three-stream engine of FIGS. 1 and 2.

With reference now to FIG. 12 in addition to FIGS. 1-2 and 3-4, FIG. 12 provides a graph depicting booster variable stator vane position scheduled as a function of a power level of the three-stream engine 100. As depicted, the shape of the secondary effector schedule 354 associated with the booster inlet guide vanes 260 is similar to the shape of the effector schedule 352 depicted in FIG. 5 associated with the inlet guide vanes 240.

The secondary effector schedule 354 associated with a position of the booster inlet guide vanes 260 is depicted as a function of power level. The secondary effector schedule 354 can be generated and output by execution of the power management module 350 as depicted in FIG. 4. For this embodiment, the secondary effector schedule 354 has a negative exponential shape as depicted in FIG. 12. The secondary effector schedule 354 is a default or base schedule that the secondary effector demands 394 are generated in accordance with unless the secondary effector schedule 354 is constrained by another demand or limit.

In accordance with the secondary effector schedule 354, the lower the power level of the three-stream engine 100, the more closed the booster inlet guide vanes 260 are moved. Moving the booster inlet guide vanes 260 more closed back pressures the mid-fan 190, thereby affecting the airflow through the secondary bypass flowpath 172. In contrast, in accordance with the secondary effector schedule 354, the higher the power level of the three-stream engine 100, the more open the booster inlet guide vanes 260 are moved. Moving the booster inlet guide vanes 260 more open increases the pumping ability of the mid-fan 190, which changes one or more properties of the airflow through the secondary bypass flowpath 172.

As further shown in FIG. 12, in addition to the secondary effector schedule 354, various demands and limits are depicted. Particularly, an operability demand 372A associated with operability of the secondary effector 410 (the booster inlet guide vanes 260 in this example), an operability demand 372B associated with operability of the mid-fan 190, and effector limits 382 are depicted. The operability demands 372A, 372B are movable along the y-axis of the graph. The operability demand 372A is movable along the y-axis of the graph based on the sensor data 432 indicating one or more operating parameters associated with the LP compressor 126. The operability demand 372B is movable along the y-axis of the graph based on the sensor data 432 indicating one or more operating parameters associated with the mid-fan 190.

In some embodiments, the one or more processors of the engine controller 340 are configured to determine the secondary effector demand 394 based at least in part on the interaction between: i) the secondary effector schedule 354 determined based at least in part on the thrust demand 330, ii) the operability demand 372A associated with operability of the secondary effector 410 (or in this example the booster inlet guide vanes 260); and iii) the operability demand 372B associated with operability of the mid-fan 190. As the operability demand 372B associated with operability of the mid-fan 190 is considered, the control logic of the secondary effector 410 can be said to be ganged with the control logic of the mid-fan 190.

Generally, the position of the booster inlet guide vanes 260 is selected in accordance with the secondary effector schedule 354 unless other demands and/or limits 372A, 372B, 382 intersect with or are selected as being of higher priority, which may cause the position of the booster inlet guide vanes 260 to deviate from the secondary effector schedule 354. The priority of the demands and/or limits may be preselected, e.g., by the supervisory system 320 and/or the engine controller 340. In some embodiments, the operability demand 372A associated with the booster inlet guide vanes 260 is selected as being of higher priority than the operability demand 372B associated with the mid-fan 190.

Stated another way, the one or more processors of the engine controller 340 are configured to determine the secondary effector demand 394 based at least in part on a secondary effector schedule 354 and one or more secondary constraints, the secondary effector schedule 354 being determined based at least in part on the thrust demand 330, the one or more secondary constraints including at least one of: i) an operability demand 372A associated with operability of the secondary effector 410; and ii) an operability demand associated with operability of the mid-fan 190. Further, the one or more processors of the engine controller 340 are configured to cause the secondary effector 410 to assist with adjustment of the airflow through the secondary bypass flowpath 172 based at least in part on the secondary effector demand 394.

In yet other embodiments, in addition or alternatively to the booster inlet guide vanes 260, the secondary effector 410 can include the variable bleed valve 270. In such embodiments, in causing the secondary effector 410, or the variable bleed valve 270 in this example, to assist with adjustment of the airflow through the secondary bypass flowpath 172, the one or more processors of the engine controller 340 are configured to cause adjustment of a position of the variable bleed valve 270. The one or more processors of the engine controller 340 can cause adjustment of the position of the variable bleed valve 270 so that core air from the core flowpath 142 is directed into one of the offboard bleed duct 272 and the secondary bleed duct 274.

Figure 13:
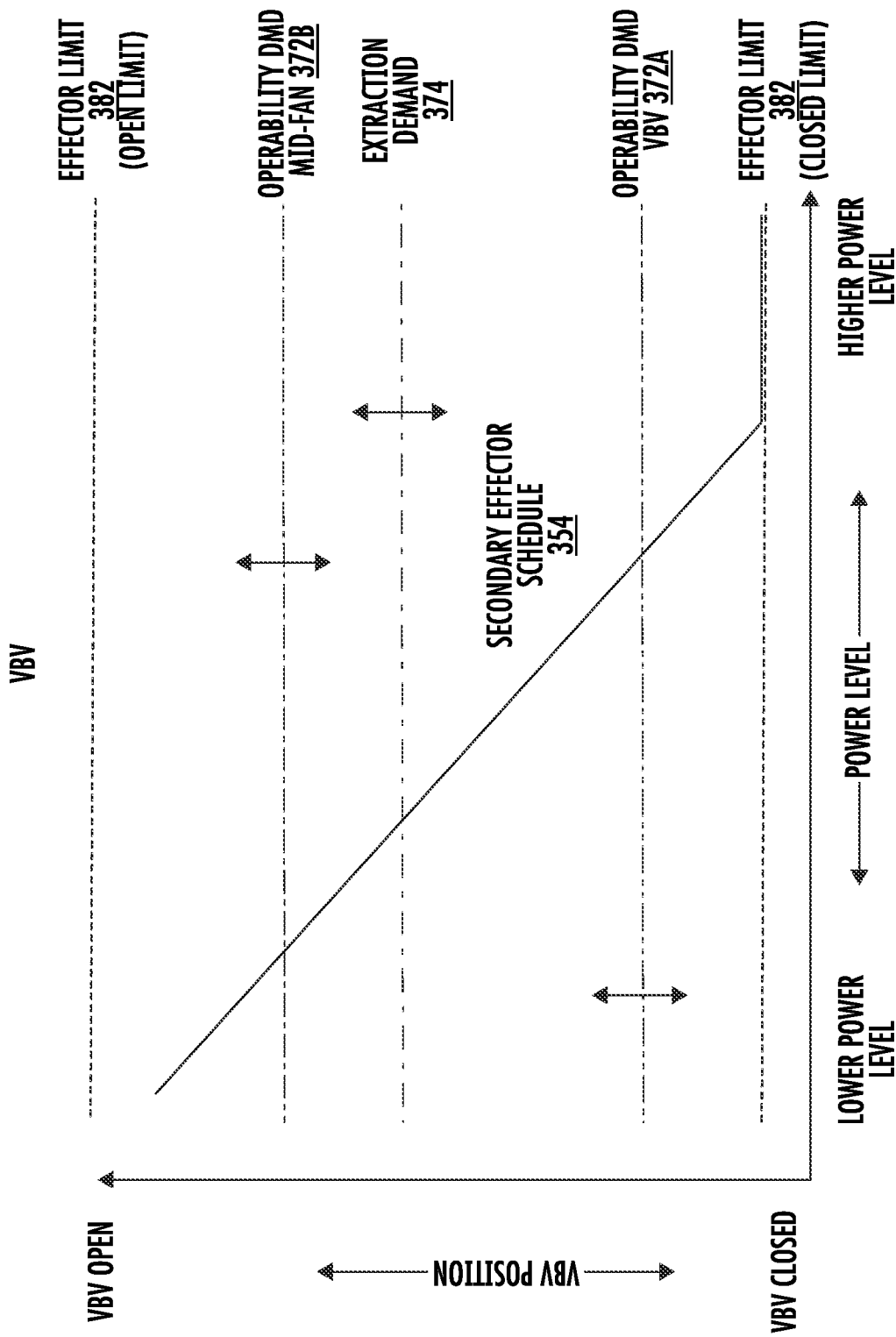
FIG. 13 provides a graph depicting variable bleed valve scheduled as a function of a power level of the three-stream engine of FIGS. 1 and 2.

With reference now to FIG. 13 in addition to FIGS. 1-2 and 3-4, FIG. 13 provides a graph depicting variable bleed valve position scheduled as a function of a power level of the three-stream engine 100. The secondary effector schedule 354 associated with a position of the variable bleed valve 270 is depicted as a function of power level. The shape of the secondary effector schedule 354 associated with the variable bleed valve 270 is generally linear having a negative slope and transitions to a constant function at higher power levels. The secondary effector schedule 354 can be generated and output by execution of the power management module 350 as depicted in FIG. 4. The secondary effector schedule 354 is a default or base schedule that the secondary effector demands 394 are generated in accordance with unless other demands or limits are of higher priority than the secondary effector schedule 354.

In accordance with the secondary effector schedule 354, the lower the power level of the three-stream engine 100, the more open the variable bleed valve 270 is moved. In contrast, in accordance with the secondary effector schedule 354, the higher the power level of the three-stream engine 100, the more closed the variable bleed valve 270 is moved.

When air is bled through the variable bleed valve 270 to the secondary bypass flowpath 172 via the secondary bleed duct 274, moving the variable bleed valve 270 more open back pressures the mid-fan 190, which changes one or more properties of the airflow through the secondary bypass flowpath 172. In addition, in such a bleed arrangement, moving the variable bleed valve 270 more closed increases the pumping ability of the mid-fan 190, which changes one or more properties of the airflow through the secondary bypass flowpath 172.

When air is bled through the variable bleed valve 270 offboard via the offboard bleed duct 272, moving the variable bleed valve 270 more open reduces the pressure on the mid-fan 190, which changes one or more properties of the airflow through the secondary bypass flowpath 172. Further, in such a bleed arrangement, moving the variable bleed valve 270 more closed increases the pressure on the mid-fan 190, which changes one or more properties of the airflow through the secondary bypass flowpath 172.

As further shown in FIG. 13, in addition to the secondary effector schedule 354, various demands and limits are depicted. Particularly, an operability demand 372A associated with operability of the secondary effector 410 (the variable bleed valve 270 in this example), an operability demand 372B associated with operability of the mid-fan 190, an extraction demand 374 indicating a minimum open position the variable bleed valve is to be set (e.g., to expel debris or to be opened during takeoff and climb operations), and effector limits 382 are depicted. The operability demands 372A, 372B are movable along the y-axis of the graph. The operability demand 372A is movable along the y-axis of the graph based on the sensor data 432 indicating one or more operating parameters associated with the variable bleed valve 270. The operability demand 372B is movable along the y-axis of the graph based on the sensor data 432 indicating one or more operating parameters associated with the mid-fan 190. The extraction demand 374 can be output by the operability module 370 and is also movable along the y-axis of the graph. As noted, the extraction demand 374 indicates a minimum open position the variable bleed valve 270 is to be set. For instance, during takeoff and climb operations, the variable bleed valve 270 may be set more open to prevent engine stalls. However, during cruise operations, the variable bleed valve 270 may be able to be more closed as operation is typically more steady state.

In some embodiments, the one or more processors of the engine controller 340 are configured to determine the secondary effector demand 394 for the variable bleed valve 270 based at least in part on the interaction between i) the secondary effector schedule 354 determined based at least in part on the thrust demand 330, ii) the operability demand 372A associated with operability of the secondary effector 410 (or in this example the variable bleed valve 270); iii) the operability demand 372B associated with operability of the mid-fan 190; and iv) the extraction demand 374 indicating the minimum open position the variable bleed valve 270 is to be set. As noted above, as the operability demand 372B associated with operability of the mid-fan 190 is considered, the control logic of the secondary effector 410 can be said to be ganged with the control logic of the mid-fan 190.

Generally, the position of the variable bleed valve 270 is selected in accordance with the secondary effector schedule 354 unless other demands and/or limits 372A, 372B, 374, 382 intersect with or are selected as being of higher priority, which may cause the position of the variable bleed valve 270 to deviate from the secondary effector schedule 354. The priority of the demands and/or limits may be preselected, e.g., by the supervisory system 320 and/or the engine controller 340. In some embodiments, the operability demand 372A associated with the variable bleed valve 270 is selected as being of higher priority than the operability demand 372B associated with the mid-fan 190, which is selected as being of higher priority than the extraction demand 374.

Stated differently, in some embodiments, the one or more processors of the engine controller 340 are configured to determine the secondary effector demand 394 for the variable bleed valve 270 based at least in part on the secondary effector schedule 354 and the one or more secondary constraints, the one or more secondary constraints including at least one of: i) the operability demand 372A associated with operability of the secondary effector 410; ii) the operability demand 372B associated with operability of the mid-fan 190; and iii) an extraction demand 374 indicating a minimum open position the variable bleed valve 270 is to be set. Moreover, the one or more processors of the engine controller 340 are configured to cause adjustment of the position of the variable bleed valve 270 so that core air from the core flowpath 142 is directed into one of the offboard bleed duct 272 and the secondary bleed duct 274.

FIG. 14 provides a flow diagram for a method 500 of operating a three-stream engine for an aircraft according to one example embodiment of the present disclosure. For instance, the method 500 can be used to operate the three-stream engine 100 of FIGS. 1 and 2, FIG. 3, as well as other three-stream engines. It will be appreciated that method 500 is discussed herein to describe exemplary aspects of the present subject matter and is not intended to be limiting.

At 502, the method 500 includes determining, by one or more processors, an effector demand for an effector of the three-stream gas turbine engine, the three-stream engine having a primary fan and a mid-fan and defining a primary bypass flowpath, a secondary bypass flowpath, and a core flowpath, the effector demand being determined based at least in part on an interaction between: i) an effector schedule determined based at least in part on a thrust demand, the thrust demand being associated with thrust to be produced by the three-stream gas turbine engine; ii) a thermal demand associated with a thermal management system coupled to or integrated with the three-stream gas turbine engine; iii) an operability demand associated with operability of the three-stream gas turbine engine; and iv) a thrust limit associated with controllability of the aircraft. In some implementations, for example, the effector demand can be determined in accordance with the effector schedule. In this regard, the effector schedule can be a base schedule. However, when one of the demands or limits is selected or determined as being of a higher priority, the effector demand can be determined in accordance with that constraint, which may be a demand or limit.

In some implementations, the effector is an array of inlet guide vanes positioned upstream of a mid-fan of the three-stream engine. The mid-fan is positioned downstream of a primary fan, which may be ducted or unducted. In such implementations, in causing the effector to adjust the airflow through the secondary bypass flowpath, the method can include causing, by the one or more processors, adjustment of a position of the inlet guide vanes, e.g., to a more open or closed position.

In other implementations, the effector is a variable nozzle positioned along the secondary bypass flowpath. In such implementations, in causing the effector to adjust the airflow through the secondary bypass flowpath, the method can include causing, by the one or more processors, adjustment of a position of the variable nozzle, e.g., to a more open or closed position.

In yet other implementations, the effector is an electric machine mechanically coupled with the shaft to which the mid-fan is also mechanically coupled. In such implementations, in causing the effector to adjust the airflow through the secondary bypass flowpath, the method can include causing, by the one or more processors, the electric machine to adjust a torque applied to the shaft.

In some further implementations, the effector is a primary fan positioned upstream of the mid-fan. In such implementations, in causing the effector to adjust the airflow through the secondary bypass flowpath, the method can include causing, by the one or more processors, at least one of: i) adjustment of a pitch of fan blades of the primary fan; and ii) adjustment of a rotational speed of the primary fan.

In yet other implementations, the effector can include the inlet guide vanes positioned upstream of the mid-fan, the variable nozzle, the electric machine, and the primary fan, or any possible combination thereof.

In some implementations, the method 500 includes, determining, by the one or more processors, the effector schedule based at least in part on the thrust demand and data indicating one or more operating parameters associated with the three-stream gas turbine engine. The method 500 can further include outputting, by the one or more processors, the effector demand in accordance with the effector schedule, e.g., as shown up to time t1 and after time t6 in FIG. 6.

In some implementations, the method 500 includes, determining, by the one or more processors, the operability demand based at least in part on the data indicating the one or more operating parameters associated with the three-stream gas turbine engine. The method 500 can further include determining, by the one or more processors, that the operability demand is a highest priority constraint. In response to the operability demand being determined as the highest priority constraint, the effector demand is output in accordance with the operability demand, e.g., as shown at time t3 to time t6 in FIG. 7.

In some implementations, the method 500 includes, determining, by the one or more processors, the thrust limit based at least in part on the thrust demand. The method 500 can also include determining, by the one or more processors, that the thrust limit is a highest priority constraint. In response to the thrust limit being determined as the highest priority constraint, the effector demand is output in accordance with the thrust limit, e.g., as shown at time t3 to time t5 in FIG. 6.

In some implementations, the method 500 includes, receiving, by the one or more processors, the thermal demand. The thermal demand received can be associated with an aircraft thermal management system, an engine thermal management system, or a summation of the two. The method 500 can also include determining, by the one or more processors, that the thermal demand is a highest priority constraint. In response to the thermal demand being determined as the highest priority constraint, the effector demand is output in accordance with the thermal demand, e.g., as shown at time t2 to time t3 in FIG. 6 as well as time t5 to time t6 in FIG. 6.

At 504, the method 500 includes causing, by the one or more processors, the effector to adjust an airflow through a secondary bypass flowpath defined by the three-stream engine based at least in part on the effector demand.

In some further implementations, optionally, the method can include determining, by the one or more processors, a secondary effector demand associated with a second effector positioned downstream of the mid-fan along the core flowpath based at least in part on an interaction between: i) a secondary effector schedule determined based at least in part on the thrust demand; ii) an operability demand associated with operability of the secondary effector; and iii) an operability demand associated with operability of the mid-fan. Further, in such implementations, the method can include causing, by the one or more processors, the secondary effector to assist with adjustment of the airflow through the secondary bypass flowpath based at least in part on the secondary effector demand.

In some implementations, the three-stream gas turbine engine has a compressor having one or more stages of compressors rotor blades and compressor stator vanes, wherein at least one stage of compressor stator vanes are variable stator vanes. For instance, the variable stator vanes can be booster inlet guide vanes of a low pressure compressor or booster of the engine. In such implementations, the secondary effector can be the variable stator vanes. In causing the secondary effector to assist with adjustment of the airflow through the secondary bypass flowpath, the one or more processors can be configured to cause adjustment of a position of the variable stator vanes.

In yet other implementations, the three-stream gas turbine engine has a low pressure compressor positioned along the core flowpath downstream of the mid-fan, a high pressure compressor positioned along the core flowpath downstream of the low pressure compressor, and a variable bleed valve positioned downstream of the low pressure compressor and upstream of the high pressure compressor. In such implementations, the secondary effector can be the variable bleed valve. In causing the secondary effector to assist with adjustment of the airflow through the secondary bypass flowpath, the one or more processors can be configured to cause adjustment of a position of the variable bleed valve. Particularly, in some implementations, the method can include determining, by the one or more processors, the secondary effector demand based at least in part on an interaction between: i) the secondary effector schedule determined based at least in part on the thrust demand; ii) the operability demand associated with operability of the secondary effector; and iii) the operability demand associated with operability of the mid-fan; and iv) an extraction demand indicating a minimum open position the variable bleed valve is to be set. In such implementations, the one or more processors are configured to cause adjustment of the position of the variable bleed valve so that core air from the core flowpath is directed into one of the offboard bleed duct and the secondary bleed duct.

In some implementations, the three-stream gas turbine engine defines a primary fan radius to mid-fan radius ratio as being equal to or greater than 2.0 and less than or equal to 6.5, the primary fan radius to mid-fan radius ratio being defined by a radius spanning between a longitudinal axis defined by the three-stream gas turbine engine and a leading edge tip of one of the primary fan blades of the primary fan to a radius spanning between the longitudinal axis and a leading edge tip of one of the mid-fan blades of the mid-fan.

Figure 15:
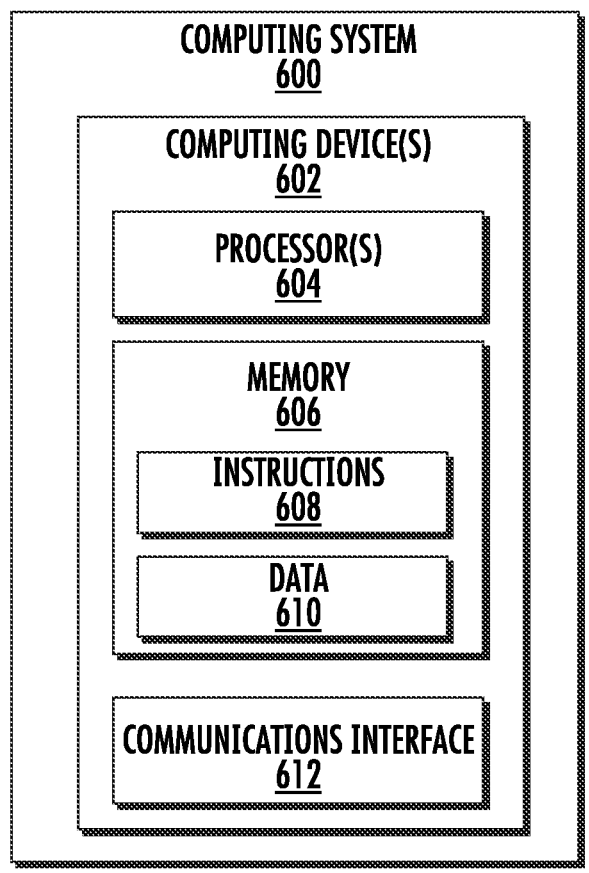
FIG. 15 provides a block diagram of a computing system for implementing one or more aspects of the present disclosure according to example embodiments of the present disclosure.

FIG. 15 provides a block diagram of an example computing system 600. The computing system 600 can be used to implement the aspects disclosed herein. The computing system 600 can include one or more computing device(s) 602. The engine controller 340 and the supervisory system 320 disclosed herein can be constructed and may operate in a same or similar manner as one of the computing devices 602, for example.

As shown in FIG. 15, the one or more computing device(s) 602 can each include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable medium or media, RAM, ROM, hard drives, flash drives, and other memory devices, such as one or more buffer devices.

The one or more memory device(s) 606 can store information accessible by the one or more processor(s) 604, including computer-readable or computer-executable instructions 608 that can be executed by the one or more processor(s) 604. The instructions 608 can be any set of instructions or control logic that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations.

The memory device(s) 606 can further store data 610 that can be accessed by the processor(s) 604. For example, the data 610 can include sensor data such as engine parameters, model data, logic data, etc., as described herein. The data 610 can include one or more table(s), function(s), algorithm(s), model(s), equation(s), etc. according to example embodiments of the present disclosure.

The one or more computing device(s) 602 can also include a communication interface 612 used to communicate, for example, with the other components of the aircraft. The communication interface 612 can include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

To summarize, three-stream engines architecturally arranged and operable to implement one or more of the disclosed control schemes may allow for optimized or otherwise improved performance and constraint handling of such three-stream engines. One or more effectors, and optionally one or more secondary effectors, can be controlled to adjust a thrust contribution provided by a secondary bypass flowpath to a net propulsive thrust of a three-stream engine as well as a thermal contribution provided by the secondary bypass flowpath to an associated thermal management system. Competing demands, limits, and priorities can be considered in controlling the one or more effectors to balance the thrust and thermal demands of the three-stream engine, as well as the operability and hardware limitations of the three-stream engine. The controllability of the aircraft or vehicle to which the three-stream engine is mounted may also be considered.

Further aspects of the present disclosure are provided by the subject matter of the following clauses:

1. A three-stream gas turbine engine for an aircraft, comprising: a shaft; a primary fan mechanically coupled with the shaft; a mid-fan positioned downstream of the primary fan and mechanically coupled with the shaft; an engine core; a core cowl surrounding at least a portion of the engine core, a core flowpath being defined between the engine core and the core cowl; an outer cowl surrounding at least a portion of the core cowl, a secondary bypass flowpath being defined between the core cowl and the outer cowl; an effector; and one or more processors configured to: determine an effector demand based at least in part on an effector schedule and one or more constraints, the effector schedule being determined based at least in part on a thrust demand associated with thrust to be produced by the three-stream gas turbine engine, the one or more constraints including at least one of: i) a thermal demand associated with a thermal management system coupled to or integrated with the three-stream gas turbine engine; ii) an operability demand associated with operability of the three-stream gas turbine engine; and iii) a thrust limit associated with controllability of the aircraft; and cause the effector to adjust an airflow through the secondary bypass flowpath based at least in part on the effector demand.

2. The three-stream gas turbine engine of any preceding clause, wherein the effector is an array of inlet guide vanes positioned upstream of the mid-fan.

3. The three-stream gas turbine engine of any preceding clause, wherein the effector is a variable nozzle positioned along the secondary bypass flowpath.

4. The three-stream gas turbine engine of any preceding clause, wherein the effector includes an array of inlet guide vanes positioned upstream of the mid-fan and a variable nozzle positioned along the secondary bypass flowpath.

5. The three-stream gas turbine engine of any preceding clause, wherein the effector is an electric machine mechanically coupled with the shaft, and wherein in causing the effector to adjust the airflow through the secondary bypass flowpath, the one or more processors are configured to: cause the electric machine to adjust a torque applied to the shaft.

6. The three-stream gas turbine engine of any preceding clause, wherein the effector is the primary fan, and wherein in causing the effector to adjust the airflow through the secondary bypass flowpath, the one or more processors are configured to: cause at least one of: i) adjustment of a pitch of fan blades of the primary fan; and ii) adjustment of a rotational speed of the primary fan.

7. The three-stream gas turbine engine of any preceding clause, further comprising: a secondary effector positioned downstream of the mid-fan along the core flowpath, and wherein the one or more processors are configured to: determine a secondary effector demand based at least in part on a secondary effector schedule and one or more secondary constraints, the secondary effector schedule being determined based at least in part on the thrust demand, the one or more secondary constraints including at least one of: i) an operability demand associated with operability of the secondary effector; and ii) an operability demand associated with operability of the mid-fan; and cause the secondary effector to assist with adjustment of the airflow through the secondary bypass flowpath based at least in part on the secondary effector demand.

8. The three-stream gas turbine engine of any preceding clause, further comprising: a compressor having one or more stages of compressors rotor blades and compressor stator vanes, wherein at least one stage of compressor stator vanes are variable stator vanes, and wherein the secondary effector is the variable stator vanes.

9. The three-stream gas turbine engine of any preceding clause, further comprising: a low pressure compressor positioned along the core flowpath downstream of the mid-fan; a high pressure compressor positioned along the core flowpath downstream of the low pressure compressor; and a variable bleed valve positioned downstream of the low pressure compressor and upstream of the high pressure compressor, and wherein the secondary effector is the variable bleed valve, and wherein in causing the secondary effector to assist with adjustment of the airflow through the secondary bypass flowpath, the one or more processors are configured to: cause adjustment of a position of the variable bleed valve.

10. The three-stream gas turbine engine of any preceding clause, wherein the three-stream gas turbine engine defines at least one of an offboard bleed duct and a secondary bleed duct, the offboard bleed duct providing fluid communication between the core flowpath and offboard the three-stream gas turbine engine, the secondary bleed duct providing fluid communication between the core flowpath and the secondary bypass flowpath, and wherein the one or more processors are configured to: determine the secondary effector demand based at least in part on the secondary effector schedule and the one or more secondary constraints, the one or more secondary constraints including at least one of: i) the operability demand associated with operability of the secondary effector; ii) the operability demand associated with operability of the mid-fan; and iii) an extraction demand indicating a minimum open position the variable bleed valve is to be set, and wherein the one or more processors are configured to cause adjustment of the position of the variable bleed valve so that core air from the core flowpath is directed into one of the offboard bleed duct and the secondary bleed duct.

11. The three-stream gas turbine engine of any preceding clause, wherein the one or more processors are configured to: determine the effector schedule based at least in part on the thrust demand and data indicating one or more operating parameters associated with the three-stream gas turbine engine; and output the effector demand in accordance with the effector schedule.

12. The three-stream gas turbine engine of any preceding clause, wherein the one or more processors are configured to: determine the operability demand based at least in part on data indicating one or more operating parameters associated with the three-stream gas turbine engine; and determine that the operability demand is a highest priority constraint, and wherein, in response to the operability demand being the highest priority constraint, the effector demand is output in accordance with the operability demand.

13. The three-stream gas turbine engine of any preceding clause, wherein the one or more processors are configured to: determine the thrust limit based at least in part on the thrust demand; and determine that the thrust limit is a highest priority constraint, and wherein, in response to the thrust limit being the highest priority constraint, the effector demand is output in accordance with the thrust limit.

14. The three-stream gas turbine engine of any preceding clause, wherein the one or more processors are configured to: receive the thermal demand, and determine that the thermal demand is a highest priority constraint, and wherein, in response to the thermal demand being the highest priority constraint, the effector demand is output in accordance with the thermal demand.

15. The three-stream gas turbine engine of any preceding clause, wherein the three-stream gas turbine engine defines a primary fan radius to mid-fan radius ratio as being equal to or greater than 2.0 and less than or equal to 6.5, the primary fan radius to mid-fan radius ratio being defined by a radius spanning between a longitudinal axis defined by the three-stream gas turbine engine and a leading edge tip of one primary fan blade of the primary fan to a radius spanning between the longitudinal axis and a leading edge tip of one mid-fan blade of the mid-fan.

16. A non-transitory computer readable medium comprising computer-executable instructions, which, when executed by one or more processors associated with a three-stream gas turbine engine having a primary fan and a mid-fan and defining a core flowpath, a primary bypass flowpath, and a secondary bypass flowpath, cause the one or more processors to: determine an effector demand associated with an effector of the three-stream gas turbine engine, the effector demand being determined based at least in part on an interaction between: i) an effector schedule determined based at least in part on a thrust demand, the thrust demand being associated with thrust to be produced by the three-stream gas turbine engine; ii) a thermal demand associated with a thermal management system coupled to or integrated with the three-stream gas turbine engine; iii) an operability demand associated with operability of the three-stream gas turbine engine; and iv) a thrust limit associated with controllability provided by the three-stream gas turbine engine; and cause the effector to adjust an airflow through the secondary bypass flowpath based at least in part on the effector demand.

17. The non-transitory computer readable medium of any preceding clause, wherein the effector includes at least one of an array of inlet guide vanes positioned upstream of the mid-fan, a variable nozzle positioned along the secondary bypass flowpath.

18. The non-transitory computer readable medium of any preceding clause, wherein the effector includes at least one of electric machine mechanically coupled with a shaft to which the mid-fan is mechanically coupled and the primary fan.

19. The non-transitory computer readable medium of any preceding clause, wherein, when the computer-executable instructions are executed, the one or more processors are configured to: determine a secondary effector demand associated with a secondary effector positioned downstream of the mid-fan along the core flowpath, the one or more processors determine the secondary effector demand by considering: i) a secondary effector schedule determined based at least in part on the thrust demand; ii) an operability demand associated with operability of the secondary effector; and iii) an operability demand associated with operability of the mid-fan; and cause the secondary effector to assist with adjustment of the airflow through the secondary bypass flowpath based at least in part on the secondary effector demand.

20. An aircraft, comprising: a thermal management system; a three-stream gas turbine engine defining a core flowpath, a primary bypass flowpath, and a secondary bypass flowpath, the thermal management system being coupled to or integrated with the three-stream gas turbine engine, the three-stream gas turbine engine comprising: a shaft; a primary fan mechanically coupled with the shaft; a mid-fan positioned downstream of the primary fan and mechanically coupled with the shaft; an effector; and one or more processors configured to: determine an effector demand based at least in part on a thrust demand being associated with thrust to be produced by the three-stream gas turbine engine and a thermal demand associated with the thermal management system; and cause the effector to adjust an airflow through the secondary bypass flowpath based at least in part on the effector demand.

21. A method of operating a three-stream gas turbine engine for an aircraft, the method comprising: determining, by one or more processors, an effector demand for an effector of the three-stream gas turbine engine, the three-stream engine having a primary fan and a mid-fan and defining a primary bypass flowpath, a secondary bypass flowpath, and a core flowpath, the effector demand being determined based at least in part on an interaction between i) an effector schedule determined based at least in part on a thrust demand, the thrust demand being associated with thrust to be produced by the three-stream gas turbine engine; ii) a thermal demand associated with a thermal management system coupled to or integrated with the three-stream gas turbine engine; iii) an operability demand associated with operability of the three-stream gas turbine engine; and iv) a thrust limit associated with controllability of the aircraft; and causing, by the one or more processors, the effector to adjust an airflow through a secondary bypass flowpath defined by the three-stream engine based at least in part on the effector demand.

What is claimed is:

1. A three-stream gas turbine engine for an aircraft, comprising:
   a shaft;
   a primary fan mechanically coupled with the shaft;
   a mid-fan positioned downstream of the primary fan and mechanically coupled with the shaft;
   an engine core;
   a core cowl surrounding at least a portion of the engine core, a core flowpath being defined between the engine core and the core cowl;
   an outer cowl surrounding at least a portion of the core cowl, a secondary bypass flowpath being defined between the core cowl and the outer cowl;
   an effector, wherein the effector is an array of inlet guide vanes positioned upstream of the mid-fan;
   a thermal management system having one or more heat exchangers disposed in the secondary bypass flowpath; and
   one or more processors configured to:
      determine an effector demand based on an effector schedule and a thermal demand associated with the thermal management system; and
      cause the effector to adjust an airflow through the secondary bypass flowpath based at least in part on the effector demand, wherein causing the effector to adjust the airflow through the secondary bypass flowpath based at least in part on the effector demand includes:
         setting the array of inlet guide vanes to a first position in accordance with the effector schedule when the thermal demand is at a first level; and
         adjusting the array of inlet guide vanes to a second position when the thermal demand is at a second level that is greater than the first level, the second position being more closed than the first position in order to reduce temperature and mass flow of airflow through the secondary bypass flowpath and increase a rate of thermal exchange between the one or more heat exchangers and the airflow.

2. The three-stream gas turbine engine of claim 1, further comprising:
   a secondary effector positioned along the core flowpath; and
   a compressor having one or more stages of compressors rotor blades and compressor stator vanes, wherein at least one stage of compressor stator vanes are variable stator vanes, and
   wherein the secondary effector is the variable stator vanes.

3. The three-stream gas turbine engine of claim 1, further comprising:
   a low pressure compressor positioned along the core flowpath downstream of the mid-fan;
   a high pressure compressor positioned along the core flowpath downstream of the low pressure compressor; and
   a variable bleed valve positioned downstream of the low pressure compressor and upstream of the high pressure compressor, and
   wherein a secondary effector is the variable bleed valve, and
   wherein in causing the secondary effector to assist with adjustment of the airflow through the secondary bypass flowpath, the one or more processors are configured to:
      cause adjustment of a position of the variable bleed valve.

4. The three-stream gas turbine engine of claim 1, wherein the three-stream gas turbine engine defines a primary fan radius to mid-fan radius ratio as being equal to or greater than 2.0 and less than or equal to 6.5, the primary fan radius to mid-fan radius ratio being defined by a radius spanning between a longitudinal axis defined by the three-stream gas turbine engine and a leading edge tip of one primary fan blade of the primary fan to a radius spanning between the longitudinal axis and a leading edge tip of one mid-fan blade of the mid-fan.

5. The three-stream gas turbine engine of claim 1, wherein the one or more processors are further configured to:
   receive a temperature at the one or more heat exchangers from an associated temperature sensor operable to sense the temperature at the one or more heat exchangers; and
   cause the effector to adjust an airflow through the secondary bypass flowpath based at least in part on the temperature at the one or more heat exchangers.

6. The three-stream gas turbine engine of claim 1, wherein causing the effector to adjust the airflow through the secondary bypass flowpath based at least in part on the effector demand includes: holding a position of the array of inlet guide vanes for a period of time to avoid exceeding a thrust limit.

7. A non-transitory computer readable medium comprising computer-executable instructions, which, when executed by one or more processors associated with a three-stream gas turbine engine having a primary fan and a mid-fan and defining a core flowpath, a primary bypass flowpath, and a secondary bypass flowpath, cause the one or more processors to:
   determine an effector demand associated with an effector of the three-stream gas turbine engine based on an effector schedule and a thermal demand associated with a thermal management system having one or more heat exchangers disposed in the secondary bypass flowpath, wherein the effector is an array of inlet guide vanes positioned upstream of the mid-fan; and
   cause the effector to adjust an airflow through the secondary bypass flowpath based at least in part on the effector demand, wherein causing the effector to adjust the airflow through the secondary bypass flowpath based at least in part on the effector demand includes:
      setting the array of inlet guide vanes to a first position in accordance with the effector schedule when the thermal demand is at a first level; and
      adjusting the array of inlet guide vanes to a second position when the thermal demand is at a second level that is greater than the first level, the second position being more closed than the first position in order to reduce temperature and mass flow of airflow through the secondary bypass flowpath and increase a rate of thermal exchange at the thermal management system.

8. An aircraft, comprising:
   a three-stream gas turbine engine defining a core flowpath, a primary bypass flowpath, and a secondary bypass flowpath; and
   a thermal management system having one or more heat exchangers disposed in the secondary bypass flowpath, the three-stream gas turbine engine comprising:
      a shaft;
      a primary fan mechanically coupled with the shaft;
      a mid-fan positioned downstream of the primary fan and mechanically coupled with the shaft;

an engine core;

a core cowl surrounding at least a portion of the engine core, the core flowpath being defined between the engine core and the core cowl;

an outer cowl surrounding at least a portion of the core cowl, the secondary bypass flowpath being defined between the core cowl and the outer cowl;

an effector, wherein the effector is an array of inlet guide vanes positioned upstream of the mid-fan; and one or more processors configured to:
- determine an effector demand based on an effector schedule and a thermal demand associated with the thermal management system; and
- cause the effector to adjust an airflow through the secondary bypass flowpath based at least in part on the effector demand, wherein causing the effector to adjust the airflow through the secondary bypass flowpath based at least in part on the effector demand includes:
  - setting the array of inlet guide vanes to a first position in accordance with the effector schedule when the thermal demand is at a first level; and
  - adjusting the array of inlet guide vanes to a second position when the thermal demand is at a second level that is greater than the first level, the second position being more closed than the first position in order to reduce temperature and mass flow of airflow through the secondary bypass flowpath and increase a rate of thermal exchange between the one or more heat exchangers and the airflow.

9. The aircraft of claim 8, wherein the three-stream gas turbine engine further comprises:

a secondary effector positioned along the core flowpath; and a compressor having one or more stages of compressors rotor blades and compressor stator vanes, wherein at least one stage of compressor stator vanes are variable stator vanes, and wherein the secondary effector is the variable stator vanes.

* * * * *